United States Patent [19]
Sato

[11] Patent Number: 5,592,468
[45] Date of Patent: Jan. 7, 1997

[54] WIRELESS LOCAL AREA NETWORK SYSTEM WITH IMPROVED TRANSFER EFFICIENCY AND DATA TRANSFER METHOD FOR SAME

[75] Inventor: Tsuyoshi Sato, Tokyo, Japan

[73] Assignee: NEC Corporation, Tokyo, Japan

[21] Appl. No.: 501,958

[22] Filed: Jul. 13, 1995

[30] Foreign Application Priority Data

Jul. 13, 1994 [JP] Japan .................................. 6-160893

[51] Int. Cl.⁶ .......................... H04Q 1/30; H04L 12/28
[52] U.S. Cl. ................... 370/252; 370/471; 370/349; 371/32
[58] Field of Search ......................... 370/17, 95.1, 82, 370/79, 83, 94.1, 110.1, 110.4; 371/2.1, 5.1, 5.5, 32, 33, 34; 340/825.06

[56] References Cited

U.S. PATENT DOCUMENTS

| | | | |
|---|---|---|---|
| 4,720,829 | 1/1988 | Fukasawa et al. | 371/2.1 |
| 4,866,707 | 9/1989 | Marshall et al. | 370/94.1 |
| 4,939,731 | 7/1990 | Reed et al. | 371/5.5 |
| 4,941,144 | 7/1990 | Mizukami | 371/5.5 |
| 5,191,583 | 3/1993 | Pearson et al. | 371/32 |
| 5,307,351 | 4/1994 | Webster | 370/94.1 |
| 5,467,341 | 11/1995 | Matsukane et al. | 371/5.5 |

*Primary Examiner*—Douglas W. Olms
*Assistant Examiner*—Chau T. Nguyen
*Attorney, Agent, or Firm*—Sughrue, Mion, Zinn, Macpeak & Seas

[57] ABSTRACT

A pair of stations are associated with each other so that a data frame is transmittable from either to the other, the data frame including as basic fields thereof a header field, a data field with a data sequence, and a frame check field. The former comprises a calculator for calculating a total length of the basic fields, as a basic length, and/or for calculating a current error rate, a controller depending on the basic length and/or the current error rate to make either of an affirmative decision for and a negative decision against sending a request for an acknowledgment of a reception of an entire length of the data frame by the latter, and a formatter for formatting the data sequence into the data frame, the formatter being responsive to the affirmative decision to combine the basic fields and a message field containing the request, to constitute the data frame.

82 Claims, 10 Drawing Sheets

BSS = Basic Service Set
STA = Station
ESS = Extended Service Set
AP = Access Point

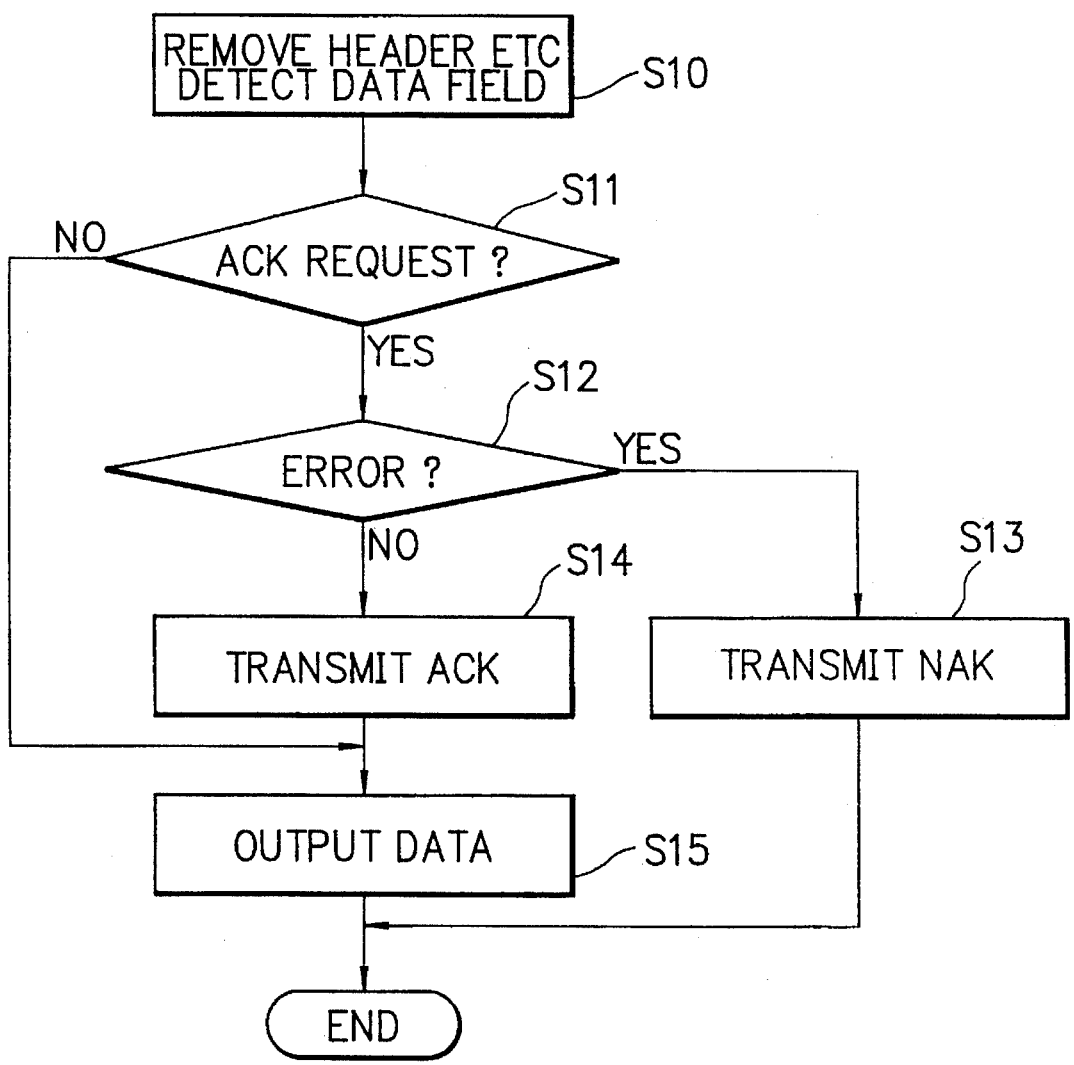

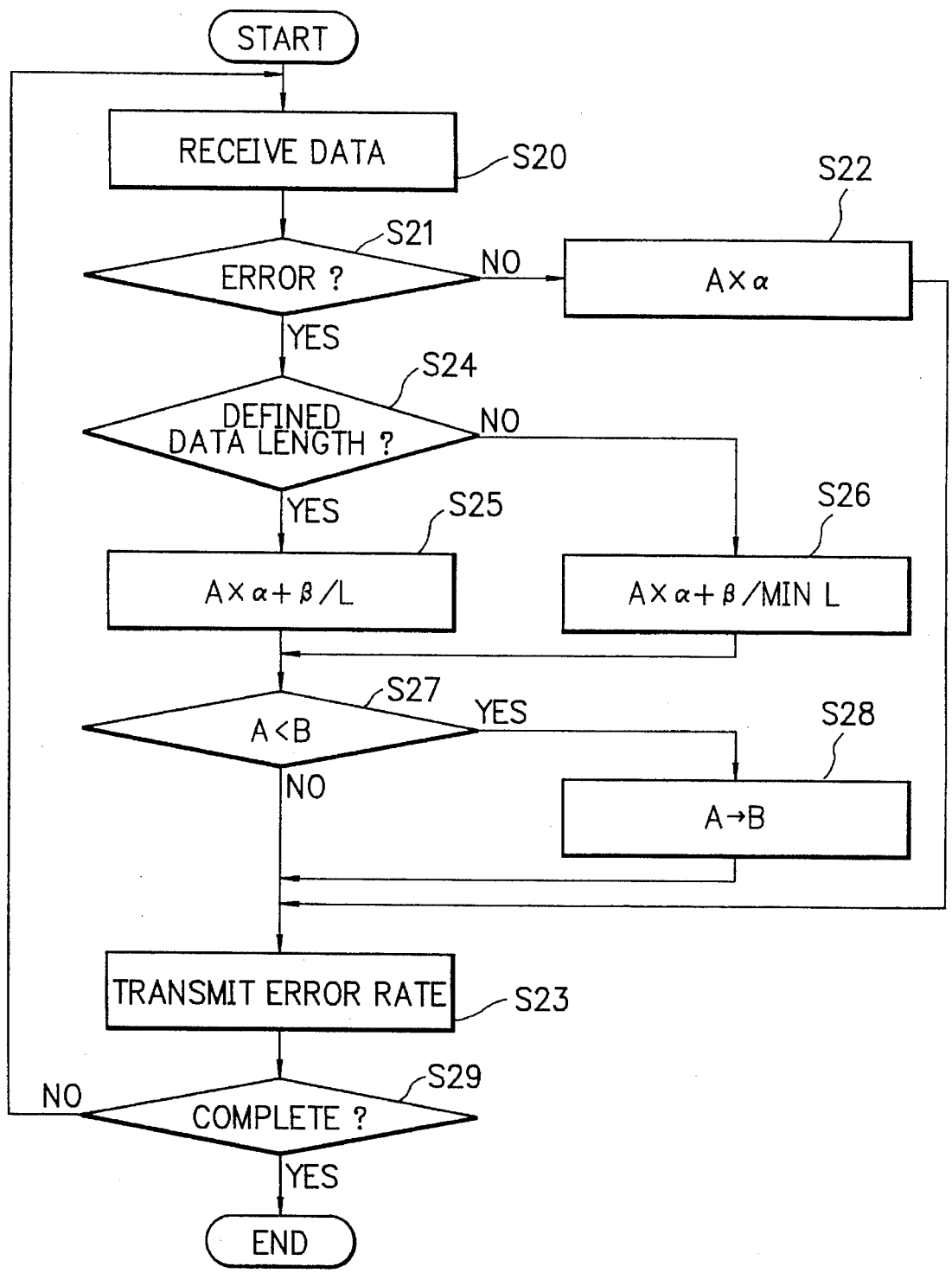

WIRELESS LOCAL AREA NETWORK SYSTEM WITH IMPROVED TRANSFER EFFICIENCY AND DATA TRANSFER METHOD FOR SAME

BACKGROUND OF THE INVENTION

The present invention generally relates to a local area network (hereafter "LAN") system, and particularly, to a wireless LAN system with an improved data transfer efficiency and to a data transfer method for the same.

DESCRIPTION OF THE RELATED ART

In general, the wireless LAN system includes a basic service set (hereafter "BSS") consisting of a set of stations (hereafter each respectively "STA") controlled by a single coordination function so that each STA has an established association with another. Any STA may be a mobile initiator and a mobile recipient, and hence an associated service area may be always dynamic. The BSS is implemented by a set of associated wireless media, and each STA contains a medium access control (hereafter "MAC") conforming to an authorized standard and a physical layer interface to the media. At each STA, an MAC service is supported by an associated MAC entity having a management layer and an MAC sublayer. An MAC protocol data unit, called "data frame" or sometimes simply "frame", is exchanged between a pair of peer MAC entities using physical layer services thereof. The data frame has a conforming MAC sublayer format (hereafter at places "MAC format").

The wireless LAN system may comprise an independent BSS as an ad-hoc network or otherwise an extended service set (hereafter "ESS") as a set of interconnected BSSs, which may also appear as a single BSS. The interconnection between any pair of BSSs in the ESS is achieved by a wireless distribution system (hereafter "DS") that may have a logically different medium. To provide a necessary access to the DS, each BSS includes an access point (hereafter "AP") as an entity having an STA functionality. Any STA may serve as an AP.

The wireless LAN system may be integrated with a wired LAN by use of a portal bridging the DS to the wired LAN.

In the wireless LAN system, any STA may include a transmitter which may connect with data terminal equipment (hereafter "DTE") such as a personal computer and a receiver which may also connect with a DTE such as a host computer.

FIG. 1 shows a typical transient state of a conventional wireless LAN system. The wireless LAN system includes a BSS-1 in which an association is established between an STA-1 as an initiator or source and an STA-2, a BSS-2 in which an association is established between an STA-3 and an STA-4 as a recipient or destination, and a DS which interconnects the BSS-1 and BSS-2 with each other to have an ESS provided therebetween through the STA-2 and STA-3 each serving as an AP to the DS. The DS is integrated with a wired LAN by a bridging portal.

Each STA includes a wireless medium consisting of a radio transmitter and a radio receiver cooperating with each other. The transmitter of STA-1 has a data processor as a DTE connected thereto. The receiver of STA-4 has a host computer as a DTE connected thereto. The STA-1 transmitter transmits a data frame to the STA-4, where it is received by the receiver, which detects a set of received data and acknowledge a receipt of transmitted data by having the STA-4 transmitter transmit an acknowledging frame (hereafter "ACK") for acknowledging a reception of correct data. Upon reception of erroneous data, there is transmitted a non-acknowledging frame (hereafter "NAK") for acknowledging a reception of erroneous data.

FIGS. 2 and 3 show associated control flows at the STA-1 and STA-4, respectively.

As shown in FIG. 2, at a step S101, the STA-1 transmitter receives a set of data from the DTE, i.e. the data processor, and renders them formatted as a data field with a sequence of leading octets added as a header, etc.

At a step S102, the STA-1 transmitter further adds to the data field a sequence of trailing octets as a cyclic redundancy checker (hereafter "CRC"), to thereby have an MAC formatted data frame, and transmits the data frame to the STA-4.

Then, at a step S103, the STA-1 receiver checks if an ACK to the data frame is transmitted from the STA-4. Unless the ACK is received therefrom, or in other words, when an NAK is received, the flow goes to the step S102 for retransmission of the data frame. When a corresponding ACK is received, an associated transmission process goes to an end.

As shown in FIG. 3, at a step S111 where the data frame transmitted from the STA-1 is received at the STA-4, the STA-4 receiver removes the leading octets including the header, etc. from the received data frame, and employs the CRC to detect or check for errors in data of the data field.

A decision step S112 is responsible for results of the error check. If an error is found, the flow goes from the step S112 to a step S113, where the STA-4 transmitter transmits an NAK to the STA-1.

In the case no errors are detected at the step S111, the flow goes from the step S112 to a step S114, where the STA-4 transmitter transmits an ACK to the STA-1, before going to a step S115, where the data of the data field are output from the STA-4 receiver to the DTE, i.e. the host computer.

After the step S118 or S115, an associated reception process goes to an end.

The ESS may include an unshown STA implemented to transmit neither ACK nor NAK upon reception of a data frame.

The conventional wireless LAN system may thus provide two types of data reception acknowledging services: a first type in which an acknowledgment is made by transmitting either of an ACK and an NAK, and a second type in which no acknowledgment is made.

The first type of service may ensure a maintained communication quality, even when a transmitted data frame has an increased length with an increased probability of an occurrence of erroneous data, but may suffer a decreased transmission rate, as the data frame has a decreased length with a needed transmission of ACK or NAK from a destination to the source side inspite of an increased probability of an ensured safe transmission.

The second type of service may have an increased transmission rate over the first type of service, as a transmitted data frame has a decreased length with an increased possibility of an ensured safe transmission, but may suffer a reduced transmission rate, as the data frame has an increased length with an increased probability of an occurrence of erroneous data, without ACK nor NAK, thus accompanying an increased frequency of insertion of an error compensating operation.

The present invention has been achieved with such points in mind.

SUMMARY OF THE INVENTION

It is therefore an object of the present invention to provide a wireless LAN system, as well as a data transfer method for the same, permitting associated entities to have both a maintained communication quality, when a transmitted data frame has an increased length, and an increased transmission rate, as the data frame has a decreased length, suffering neither a decreased transmission rate, as the data frame has a decreased length, nor a reduced transmission rate, as the data frame has an increased length, so that an improved data transfer efficiency can be achieved.

To achieve the object, a genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The firsrt station comprises a calculation means, a control means, a formatter means, and a transmission means.

The calculation means calculates a total length of the basic fields of the first frame, as a basic length of the first frame. The control means depends on the basic length of the first frame to make either of an affirmative decision for and a negative decision against sending a request message for requesting an acknowledgment of a reception of the entire length of the first frame by the second station. The formatter means formats the data sequence into the first frame. The formatter means is responsive to the affirmative decision to combine the basic fields of the first frame and a message field containing the request message, to thereby constitute the first frame. The transmission means transmits the first frame.

Moreover, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The firsrt station comprises a calculation means, a control means, a formatter means, and a transmission means.

The calculation means calculates a total length of the basic fields of the first frame, as a basic length of the first frame. The control means depends on the basic length of the first frame to make either of an affirmative decision for and a negative decision against sending a request message for requesting an interruption of an acknowledgment of a reception of the entire length of the first frame by the second station. The formatter means formats the data sequence into the first frame. The formatter means is responsive to the affirmative decision to combine the basic fields of the first frame and a message field containing the request message, to thereby constitute the first frame. The transmission means transmits the first frame.

Still more, to achieve the object, another genus of the present invention provides a wireless LAN system comprising a first station and a second station having an established association with each other so that a formatted first frame is transmittable from the first station to the second station, the first frame being composed of a first header field, a data field with a length-variable data sequence, a first message field and a first frame check field with a calculated value for a check of an entire length of the first frame, and a formatted second frame is transmittable from the second station to the first station, the second frame being composed of a second header field, a second message field, and a second frame check field. The firsrt station comprises a calculation means, a control means, a formatter means, a transmission means, a reception means and a detection means.

The calculation means calculates the entire length of the first frame. The control means depends on the entire length of the first frame to make either of an affirmative decision for and a negative decision against sending a first request message for requesting an acknowledgment of a reception of the first frame by the second station. The formatter means formats the data sequence into the first frame. The formatter means is responsive to the affirmative decision to place the first request message in the first message field, and to the negative decision to place in the first message field a second request message for requesting an interruption of the acknowledgment of the reception by the second station.

The transmission means transmits the first frame. The reception means receives the second frame transmitted in response to the first frame received by the second station. The second frame has in the second message field either of a first response message representative of the acknowledgment of the reception and a second response message respresentative of a negation thereof. The detection means detects either of the first and second response messages in the second message field to generate a detection signal having a first state and a second state thereof representative of a presence of the first response message and that of said second response message, respectively. The control means reponds to the second state of the detection signal to generate a command, subject to the affirmative decision. The transmission means responds to the command to retransmit the first frame.

Yet more, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a calculation means, a control means, a formatter means, and a transmission means.

The calculation means calculates a total length of the basic fields of the first frame, as a basic length of the first frame. The control means depends on the basic length of the first frame to make either of an affirmative decision for and a negative decision against sending a request message for requesting a response to a reception of the first frame by the second station. The response is representative of a transmission error of the first frame between the first and second stations. The formatter means formats the data sequence into the first frame. The formatter means is responsive to the affirmative decision to combine the basic fields of the first frame and a message field containing the request message, to thereby constitute the first frame. The transmission means transmits the first frame.

Further, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a calculation means, a control means, a formatter means, and a transmission means.

The calculation means calculates a total length of the basic fields of the first frame, as a basic length of the first frame. The control means depends on the basic length of the first frame to make either of an affirmative decision for and a negative decision against sending a request message for requesting a response to a reception of the first frame by the second station. The response is representative of an error rate with respect to a transmission error between the first and second stations. The formatter means formats the data sequence into the first frame. The formatter means is responsive to the affirmative decision to combine the basic fields of the first frame and a message field containing the request message, to thereby constitute the first frame. The transmission means transmits the first frame.

The second station responds to the request message to calculate the error rate and to transmit the second frame including in a message field thereof a response message representative of the error rate.

Still further, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a memory means, a calculation means, a control means, a formatter means, and a transmission means.

The memory means stores therein an updatable record of events in communications with the second station. The record includes an event data on a past tranmission of the first frame and a value data on an error rate associated therewith. The calculation means statistically determines an error rate from the event and value data. The control means depends on the error rate to make either of an affirmative decision for and a negative decision against sending a request message for requesting an acknowledgment of a reception of the entire length of the first frame by the second station. The formatter means formats the data sequence into the first frame. The formatter means is responsive to the affirmative decision to combine the basic fields of the first frame and a message field containing the request message, to thereby constitute the first frame. The transmission means transmits the first frame.

Yet further, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a memory means, a calculation means, a control means, a formatter means and a transmission means.

The memory means stores therein an updatable record of events in communications with the second station. The record includes an event data on a past tranmission of the first frame and a value data on an error rate associated therewith. The calculation means determines a statistic error rate from the event and value data. The control means depends on the statistic error rate to make either of an affirmative decision for and a negative decision against sending a request message for requesting an interruption of an acknowledgment of a reception of the entire length of the first frame by the second station. The formatter means formats the data sequence into the first frame. The formatter means is responsive to the affirmative decision to combine the basic fields of the first frame and a message field containing the request message, to thereby constitute the first frame. The transmission means transmits the first frame.

Furthermore, to achieve the object, another genus of the present invention provides a wireless LAN system comprising a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field. The first station comprises a memory means, a calculation means, a control means, a formatter means, a transmission means, a reception means, and a detection means.

The memory means stores therein an updatable record of events in communications with the second station. The record includes an event data on a past tranmission of the first frame and a value data on an error rate associated therewith. The calculation means determines a statistic error rate from the event and value data. The control means depends on the statistic error rate to make either of an affirmative decision for and a negative decision against sending a first request message for requesting an acknowledgment of a reception of the first frame by the second station. The formatter means formats the data sequence into the first frame. The formatter means is responsive to the affirmative decision to place the first request message in said the message field, and to the negative decision to place in the first message field a second request message for requesting an interruption of the acknowledgment of the reception by the second station. The transmission means transmits the first frame. The reception means receives the second frame transmitted in response to the first frame received by the second station. The second frame has in the second message field either of a first response message representative of the acknowledgment of the reception and a second response message respresentative of a negation thereof. The detection means detects either of the first and second response messages in the second message field to generate a detection signal having a first state and a second state thereof representative of a presence of the first response message and that of the second response message, respectively.

The control means responds to the second state of the detection signal to generate a command, subject to the affirmative decision. The transmission means responds to the command to retransmit the first frame.

Besides, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a memory means, a calculation means, a control means, a formatter means and a transmission means.

The memory means stores therein an updatable record of events in communications with the second station. The record includes an event data on a past tranmission of the first frame and a value data on an error rate associated therewith. The calculation means determines a statistic error rate from the event and value data. The control means depends on the statistic error rate to make either of an affirmative decision for and a negative decision against sending a request message for requesting a response to a reception of the first frame by the second station. The response is representative of a transmission error of the first frame between the first and second stations. The formatter means formats the data sequence into the first frame. The formatter means is responsive to the affirmative decision to combine the basic fields of the first frame and a message field containing the request message, to thereby constitute the first frame. The transmission means transmits the first frame.

Additionally, to achieve the object, another genus of the present invention provides a wireless LAN system comprising a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The first station comprises a memory means, a calculation means, a control means, a formatter means, and a transmission means.

The memory means stores therein an updatable record of events in communications with the second station. The record includes an event data on a past tranmission of the first frame and a value data on an error rate associated therewith. The calculation means statistically determines a first error rate from the event and value data. The control means depends on the first error rate to make either of an affirmative decision for and a negative decision against sending a first message for requesting a response to a reception of the first frame by the second station. The response is representative of a second error rate calculated at the second station with respect to a transmission error of the first frame. The formatter means formats the data sequence into the first frame. The formatter means is responsive to the affirmative decision to combine the basic fields of the first frame and a first message field containing the first message, to thereby constitute the first frame. The transmission means transmits the first frame. The second station responds to the first message to calculate the second error rate and to transmit the second frame including in a second message field thereof a second message representative of the second error rate.

To achieve the object described, a genus of the present invention provides a data transfer method for a wireless LAN system including a first station and a second station having an established association with each other so that a formatted first frame is transmittable from the first station to the second station, the first frame including as basic fields thereof a header field, a data field with a length-variable data sequence and a frame check field with a calculated value for a check of an entire length of the first frame, and a formatted second frame is transmittable from the second station to the first station. The data transfer method comprises four steps.

A first setp calculates a total length of the basic fields of the first frame, as a basic length of the first frame. A second step depends on the basic length of the first frame to make either of an affirmative decision for and a negative decision against sending a request message for requesting an acknowledgment of a reception of the entire length of the first frame by the second station. A third step formats the data sequence into the first frame, by responding to the affirmative decision to combine the basic fields of the first frame and a message field containing the request message, to thereby constitute the first frame. A fourth step transmits the first frame.

To achieve the object, another genus of the present invention provides a data transfer method for a wireless LAN system including a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The data transfer method comprises four steps.

A first step calculates a total length of the basic fields of the first frame, as a basic length of the first frame. A second step depends on the basic length of the first frame to make either of an affirmative decision for and a negative decision against sending a request message for requesting an interruption of an acknowledgment of a reception of the entire length of the first frame by the second station. A third step formats the data sequence into the first frame, by responding to the affirmative decision to combine the basic fields of the first frame and a message field containing the request message, to thereby constitute the first frame. A fourth step transmits the first frame.

To achieve the object, still another genus of the present invention provides a data transfer method for a wireless LAN system including a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field. The data transfer method comprises eight steps.

A first step calculates the entire length of the first frame. A second steps depends on the entire length of the first frame to make either of an affirmative decision for and a negative decision against sending a first request message for requesting an acknowledgment of a reception of the first frame by the second station. A third step formats the data sequence into the first frame, by responding to the affirmative decision to place the first request message in the first message field, and to the negative decision to place in the first message field a second request message for requesting an interruption of the acknowledgment of the reception by the second station. A fourth step transmits the first frame. A fifth step receives the second frame transmitted in response to the first frame received by the second station. The second frame has in the second message field either of a first response message representative of the acknowledgment of the reception and a second response message respresentative of a negation thereof. A sixth step detects either of the first and second response messages in the second message field to generate a first detection signal having a first state and a second state thereof representative of a presence of the first response message and that of the second response message, respectively. A seventh step responds to the second state of the first detection signal to generate a first command, subject to the affirmative decision. An eighth step responds to the first command to retransmit the first frame.

To achieve the object, yet another genus of the present invention provides a data transfer method for a wireless LAN system including a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The data transfer method comprises four steps.

A first step calculates a total length of the basic fields of the first frame, as a basic length of the first frame. A second step depends on the basic length of the first frame to make either of an affirmative decision for and a negative decision against sending a request message for requesting a response to a reception of the first frame by the second station. The response is representative of a transmission error of the first frame between the first and second stations. A third step formats the data sequence into the first frame, by responding to the affirmative decision to combine the basic fields of the first frame and a message field containing the request message, to thereby constitute the first frame. A fourth step transmits the first frame.

To achieve the object, the present invention provides as a genus thereof a data transfer method for a wireless LAN system including a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The data transfer method comprises five steps.

A first step calculates a total length of the basic fields of the first frame, as a basic length of the first frame. A second step depends on the basic length of the first frame to make either of an affirmative decision for and a negative decision against sending a first message for requesting a response to a reception of the first frame by the second station. The response is representative of an error rate with respect to a transmission error between the first and second stations. A third setp formats the data sequence into the first frame, by responding to the affirmative decision to combine the basic fields of the first frame and a first message field containing the request message, to thereby constitute the first frame. A fourth step transmits the first frame. A fifth step responding to the request message to calculate the error rate and to transmit the second frame including in a second message field thereof a response message representative of the error rate.

To achieve the object, the present invention provides as another genus thereof a data transfer method for a wireless LAN system including a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The data transfer method comprising five steps.

A first step stores in the first station an updatable record of events in communications with the second station. The record includes an event data on a past tranmission of the first frame and a value data on an error rate associated therewith. A second step determines a statistic error rate from the event and value data. A third step depending on the statistic error rate to make either of an affirmative decision for and a negative decision against sending a request message for requesting an acknowledgment of a reception of the entire length of the first frame by the second station. A fourth step formats the data sequence into the first frame, by responding to the affirmative decision to combine the basic fields of the first frame and a message field containing the request message, to thereby constitute the first frame. A fifth step transmits the first frame.

To achieve the object, the present invention provides as still another genus thereof a data transfer method for a wireless LAN system including a first station and a second station having an established association with each other so that a formatted first frame is transmittable from the first station to the second station, said first frame including as basic fields thereof a header field, a data field with a length-variable data sequence, and a frame check field with a calculated value for a check of an entire length of the first frame, and a formatted second frame is transmittable from the second station to the first station. The data transfer method comprises five step.

A first step stores in the first station an updatable record of events in communications with the second station. The record includes an event data on a past tranmission of the first frame and a value data on an error rate associated therewith. A second step determines a statistic error rate from the event and value data. A third step depende on the statistic error rate to make either of an affirmative decision for and a negative decision against sending a request message for requesting an interruption of an acknowledgment of a reception of the entire length of the first frame by the second station. A fourth step formats the data sequence into the first frame, by responding to the affirmative decision to combine the basic fields of the first frame and a message field containing the request message, to thereby constitute the first frame. A fifth step transmits the first frame.

To achieve the object, the present invention provides as yet another genus thereof a data transfer method for a wireless LAN system including a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field. The data transfer method comprises nine steps.

A first step stores in the first station an updatable record of events in communications with the second station. The record includes an event data on a past tranmission of the first frame and a value data on an error rate associated therewith. A second step determines a statistic error rate from the event and value data. A third step depends on the first statistic error rate to make either of an affirmative decision for and a negative decision against sending a first request message for requesting an acknowledgment of a reception of the first frame by the second station. A fourth step formats the data sequence into the first frame, by responding to the affirmative decision to place the first request message in the first message field, and to the negative decision to place in the first message field a second request message for requesting an interruption of the acknowledgment of the reception by the second station. A fifth step transmits the first frame. A sixth step receives the second frame transmitted in response to the first frame received by the second station. The second frame has in the second message field either of a first response message representative of the acknowledgment of the reception and a second response message respresentative of a negation thereof. A seventh step detects either of the first and second response messages in the second message field to generate a detection signal having a first state and a second state thereof representative of a presence of the first response message and that of the second response message, respectively. Then, an eighth step responds to the second state of the detection signal to generate a command, subject to the affirmative decision. A ninth step responds to the command to retransmit the first frame.

Additionally, to achieve the object, the present invention provides as a genus thereof a data transfer method for a wireless LAN system including a first station and a second station having an established association with each other so that a formatted first frame is transmittable from the first station to the second station, said first frame including as basic fields thereof a header field, a data field with a length-variable data sequence, and a frame check field with a calculated value for a check of an entire length of the first frame, and a formatted second frame is transmittable from the second station to the first station. The data transfer method comprises five steps.

A first step stores in the first station an updatable record of events in communications with the second station. The record includes an event data on a past tranmission of the first frame and a value data on an error rate associated therewith. A second step determining a statistic error rate from the event and value data. A third step depends on the statistic error rate to make either of an affirmative decision for and a negative decision against sending a request message for requesting a response to a reception of the first frame by the second station. The response is representative of a transmission error of the first frame between the first and second stations. A fourth step formats the data sequence into the first frame, by responding to the affirmative decision to combine the basic fields of the first frame and a message field containing the request message, to thereby constitute the first frame. A fifth step transmitting the first frame.

Yet additionally, to achieve the object, the present invention provides as a genus thereof a data transfer method for a wireless LAN system including a first station and a second station having an established association with each other so that a formatted first frame is transmittable from the first station to the second station, the first frame including as basic fields thereof a header field, a data field with a length-variable data sequence, and a frame check field with a calculated value for a check of an entire length of the first frame, and a formatted second frame is transmittable from the second station to the first station. The data transfer method comprises six steps.

A first step stores in the first station an updatable record of events in communications the said second station. The record includes an event data on a past tranmission of the first frame and a value data on an error rate associated therewith. A second step statistically determines a first error rate from the event and value data. A third step depends on the first error rate to make either of an affirmative decision for and a negative decision against sending a request message for requesting a response to a reception of the first frame by the second station. The response is representative of a second error rate calculated at the second station with respect to a transmission error of the first frame. A fourth step formats the data sequence into the first frame, by responding to the affirmative decision to combine the basic fields of the first frame and a first message field containing the request message, to thereby constitute the first frame. A fifth step transmitting the first frame. A sixth step responds to the request message to calculate the second error rate and to transmit the second frame including in a second message field thereof a response message representative of the second error rate.

According to any of the genera described, the invention provides a wireless LAN system or a data transfer method for the same, permitting associated entities to have both a maintained communication quality, when a transmitted data frame has an increased length, and an increased transmission rate, as the data frame has a decreased length, suffering neither a decreased transmission rate, as the data frame has a decreased length, nor a reduced transmission rate, as the data frame has an increased length, so that an improved data transfer efficiency can be achieved.

BRIEF DESCRIPTION OF THE DRAWINGS

The objects, features and advantages of the present invention will become more apparent from consideration of the following detailed description, taken in conjunction with the accompanying drawings, in which:

FIG. 11 is a flow chart of a reception process of the data frame of FIG. 7; and

FIG. 12 is a flow chart of an error rate determining process according to the invention, as it is applied to a reception side.

DESCRIPTION OF THE PREFERRED EMBODIMENTS

There will be detailed below preferred embodiments of the present invention and modifications thereof, with reference to FIGS. 4 to 12. Like members and services are designated at like characters for the brevity of description.

Figure 1:
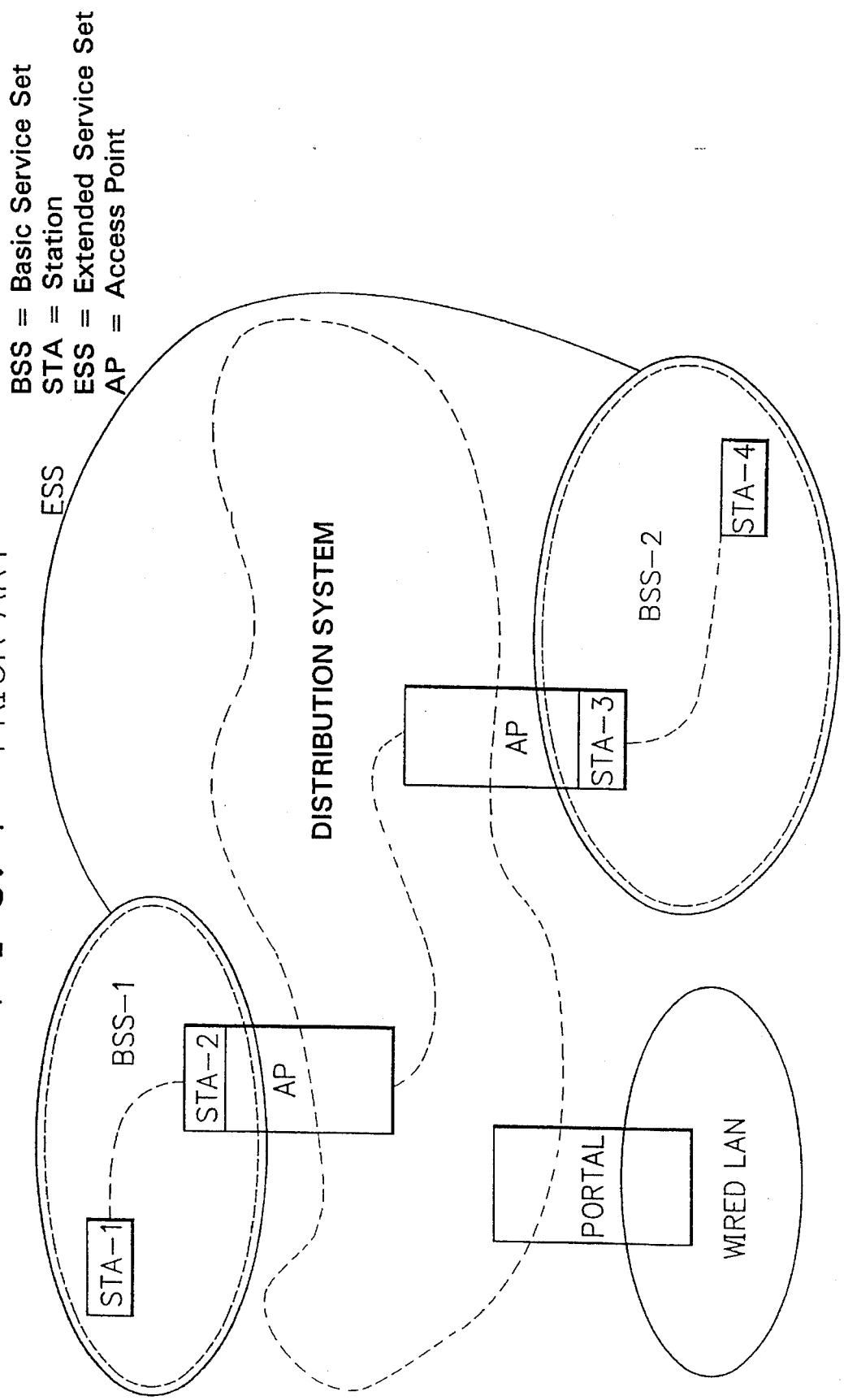
FIG. 1 is a topologic representation of a typical transient state of a conventional wireless LAN system.
Figure 2:
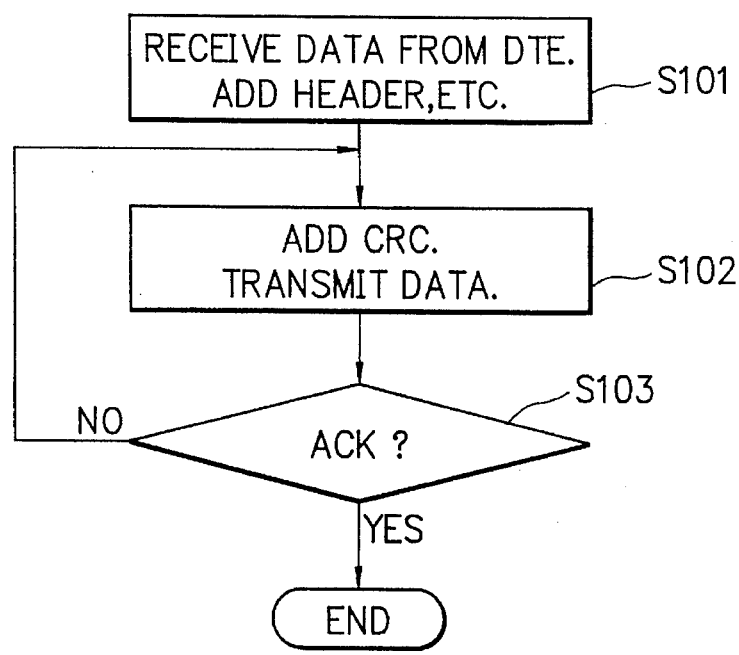
FIG. 2 is a flow chart describing an essential function at a source in the conventional wireless LAN system of FIG. 1.
Figure 3:
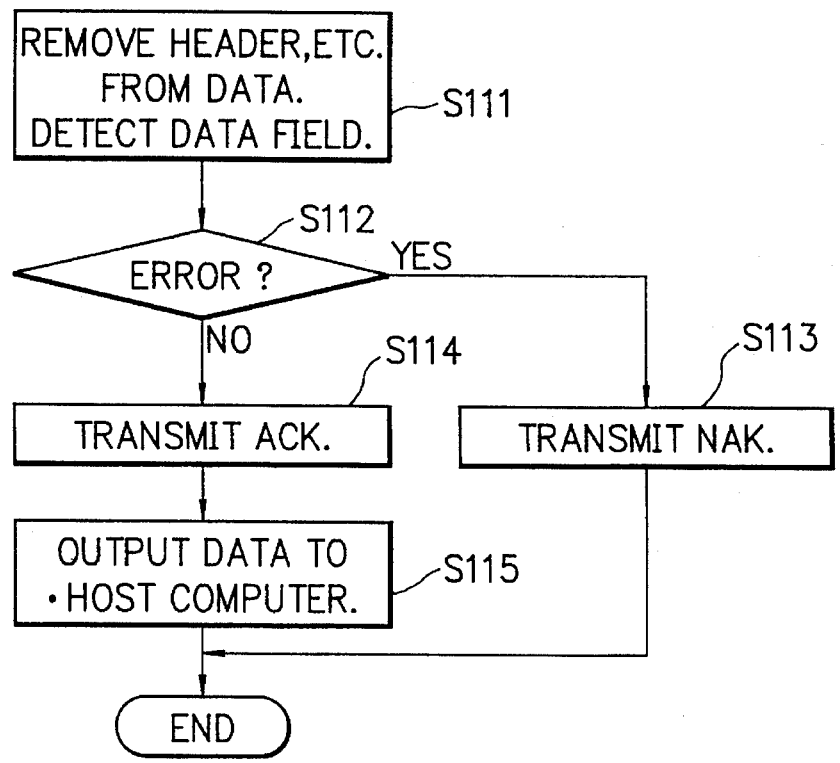
FIG. 3 is a flow chart describing an essential function at a destination in the conventional wireless LAN system of FIG. 1.

In general, as in FIG. 1 which is applicable to the invention as well, the wireless LAN system conforms to an authorized standard and thus theoretically has a basic arrangement conforming to a protocol, but practically is always dynamic.

Figure 4:
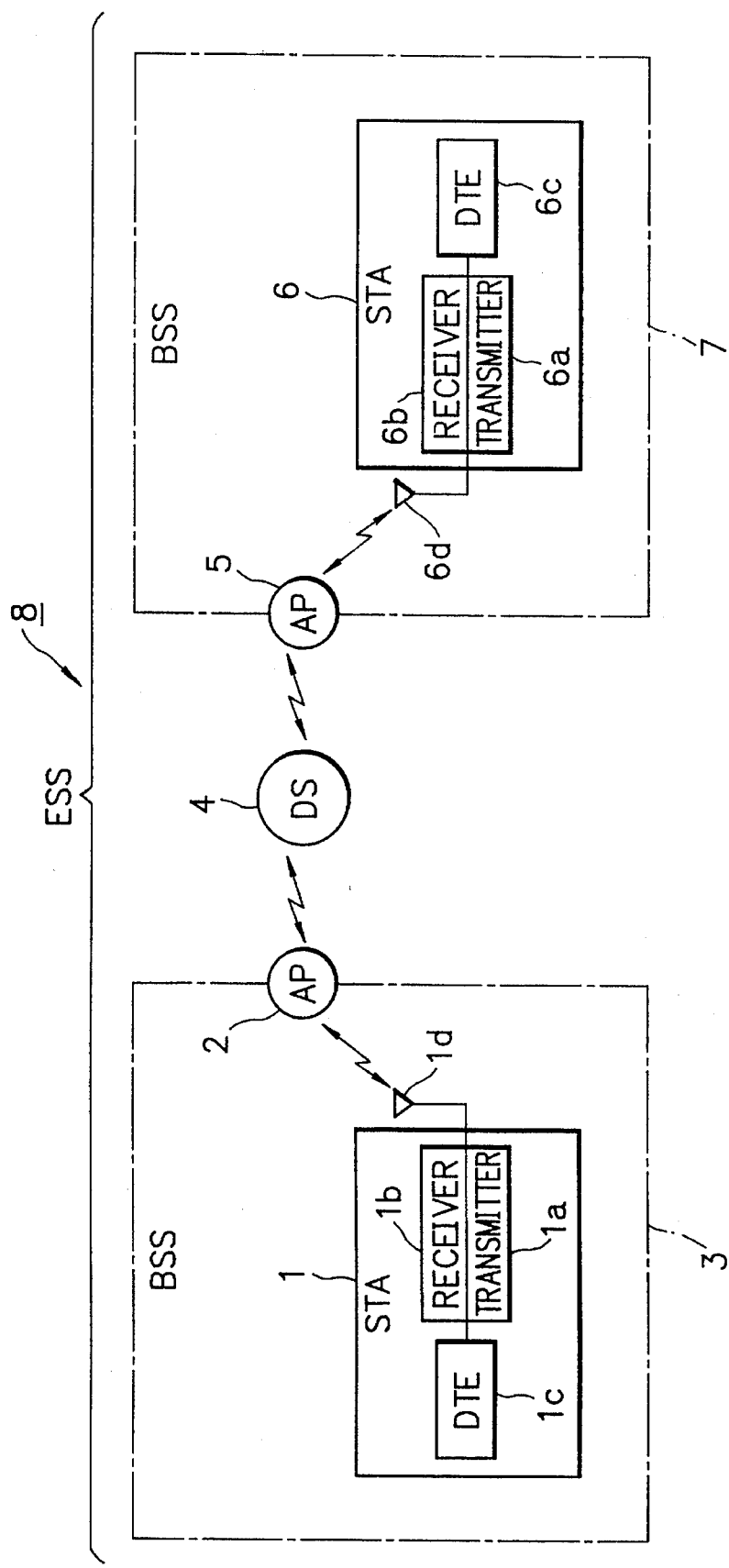
FIG. 4 is a block diagram illustrating a system arrangement common to respective wireless LAN systems according to various embodiments of the invention and modifications thereof.

FIG. 4 shows a temporal system arrangement common to respective wireless LAN systems according to the embodiments of the invention and modifications thereof.

In the arrangement of FIG. 4, the wireless LAN system includes a BSS 3 in which an association is established between an STA 1 as a temporal initiator or source and an AP 2, another BSS 7 in which an association is established between an STA 6 as a temporal recipient or destination and an AP 5, and a DS 4 which interconnects the BSS 3 and BSS 7 with each other to have an ESS 8 provided therebetween, so that the STA 1 and STA 6 has an established association with each other.

Figure 8:
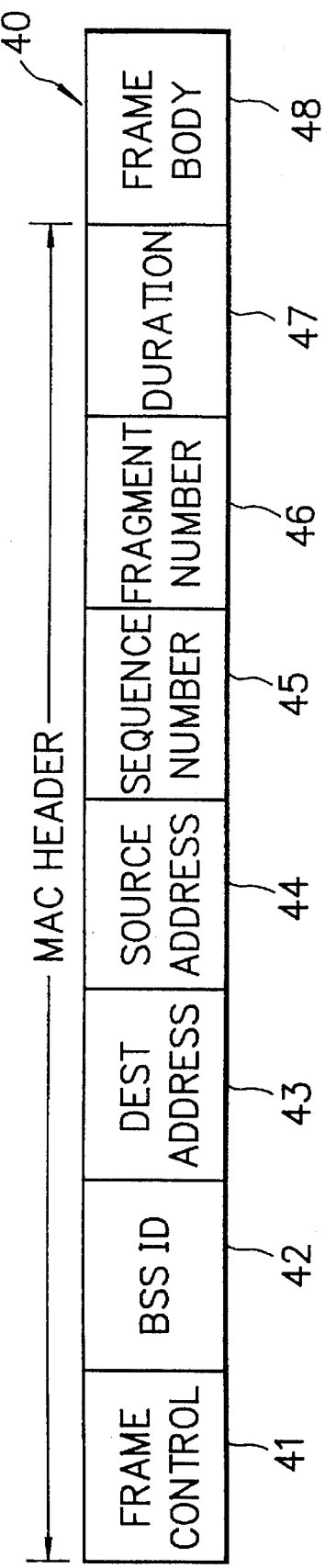
FIG. 8 is a general format of an MAC frame applicable to the invention.

Accordingly, a formatted data frame to be transmitted from the STA 1 (hereafter "first frame" for easy reference) is transmittable therefrom to the STA 6, and a formatted response frame to be transmitted from the STA 6 (hereafter "second frame" for easy reference) is transmittable therefrom to the STA 1. As shown in FIG. 8, the first and second frames each have an MAC header field and a frame body.

In the first frame, the frame body includes a data field containing a length-variable data sequence and a pad, and has a frame check field (hereafter "FRC") added thereto, the FRC containing octets as an associated CRC for a check of an entire length of the first frame. The first frame thus includes as basic fields thereof the header field, the data field, the FRC and other conforming basic fields, if any, but a later described message field such as an ACK request field 35 of FIG. 7. The basic fields have a total length thereof calculatable as a basic length of the first frame, provided that the data field has a detected (or known) length. The second frame consists of an MAC header, a message field such as of an ACK or NAK, and an FRC. In the second frame, the header and FRC will be deemed basic.

The STA 1 includes a wireless medium as radio circuitry consisting of a radio transmitter 1a and a radio receiver 1b cooperating with each other, a data processor as a DTE 1c connected thereto, and an antenna 1d. The DTE 1c has an unshown MAC frame formatter. The STA 6 also includes a wireless medium as radio circuitry consisting of a radio receiver 6a and a radio transmitter 6b cooperating with each other, a host computer as a DTE 6c connected thereto, and an antenna 6d.

Figure 5:
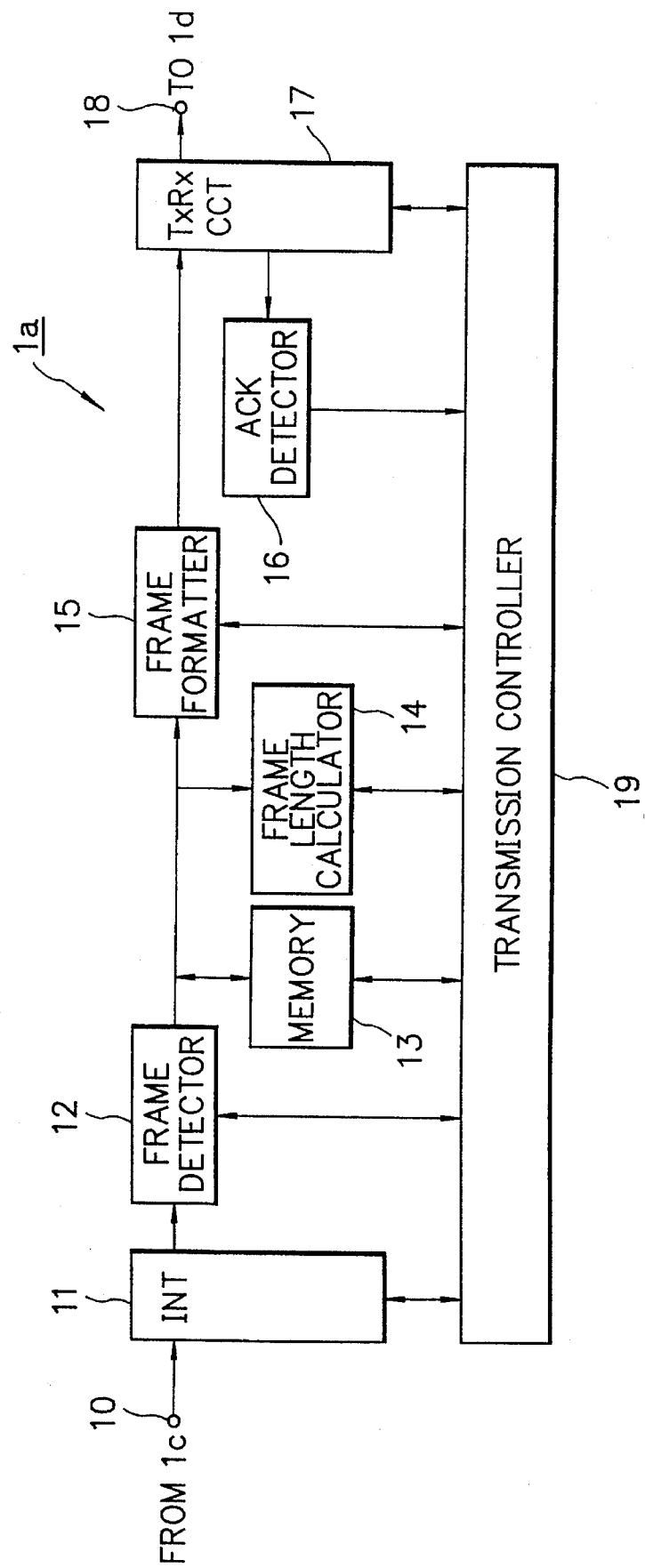
FIG. 5 is a block diagram of a radio transmitter in the system arrangement of FIG. 4.

FIG. 5 shows a transmitter section of the STA 1, i.e. the transmitter 1a and a transmission-reception (hereafter "RxTx") circuit 17 of which a Tx (transmission) circuit constitutes part of the transmitter 1a.

The transmitter 1a comprises a data input terminal 10 connected to the DTE 1c, an MAC frame interface 11 which serves as a data interface when the formatter of the DTE 1c is switched off, an MAC frame detector 12 which serves as a data length detector when the formatter of the DTE 1c is switched off, a memory 13, a frame length calculator 14 for calculating the basic length and the entire length of the first frame, an MAC frame formatter 15 which serves as a formatter for formatting an input data sequence when the formatter of the DTE 1c is switched off and as a reformatter when the formatter of the DTE 1c is switched on, an ACK detector 16 which can detect the second frame that may be an ACK, an NAK or some other response, the TxRx circuit 17, a frame output terminal 18 connected to the antenna 1d, and a transmission controller. The transmission section is controlled by the controller 19. The memory 13 is accessed from the controller 19.

The interface 11 interfaces an MAC frame or a data sequence to the detector 12, where the MAC frame or a data sequence is detected of its data field length or data length. The detector 12 sends a length representative signal to the length calculator 14, and the MAC frame or data sequence to the formatter 15, while storing the same in the memory 13. The formatter 15 formats the MAC frame or data seqeunce into a first frame, in accordance with a command from the transmission controller 19 which is informed, from the calculator 14, of a basic length and entire length of the first frame, as they are calculated by the length calculator 14. The controller 19 is further informed, from the ACK detector 16, of a content of a latest second frame that the ACK detector 16 has detected, if any. The TxRx 17 serves as a Tx circuit to send the first frame to the antenna 1d, and then is switched to serve as an Rx (reception) circuit to send a next second frame to the ACK detector 16.

The formatter 15 works in dependence on the command from the controller 19, which compares the basic length with a threshold value. For a command when the basic length is larger than the threshold value, the formatter 15 inserts a message field between the data field and FRO of the first frame. In other words, the message field is put behind the data field, and then the FRC is put behind the message field. The message field contains a request message for requesting the STA 6 to return an acknowledgment of a reception of the entire length of the first frame after a check by use of a CRC in the FRO, i.e. to send back an ACK. The ACK request message may be used as or replaced by an NAK request message, or both ACK and NAK request messages may be put in the message field, as the STA 6 may have various functions.

If the basic length is smaller than the threshold value, the formatter 15 does not insert the message field, but may likewise insert a message field with a request message for requesting an interruption of the acknowledgment of the reception, in particular when the STA 6 inherently has an ACK function. The entire length of the first frame may be used in place of the basic length thereof, as necessary.

The request massage may request, solely or in combination with the messages described, a notification of an current error rate or an occurrence or unoccurrence of a transmission error accompanied with the content. Insertion of such requests may depend on the basic length of the first frame and/or current error rate statistically determined.

The memory 13 holds the stored frame or data sequence until the controller 19 gives an update command when an corresponding ACK is detected by the ACK detector 16. If no ACK is detected or NAK is received, the controller 19 reads a content of the memory 18 to inform the formatter 15 of it, or gives a retransmission command whereto memory 13 responds to send the content to the formatter 15 or the formatter 15 may respond to read the same, so that the formatter 15 can prepare a first frame to be retransmitted. The original first frame may itself be stored in the memory 18 to permit a promtpt retransmission.

Figure 6:
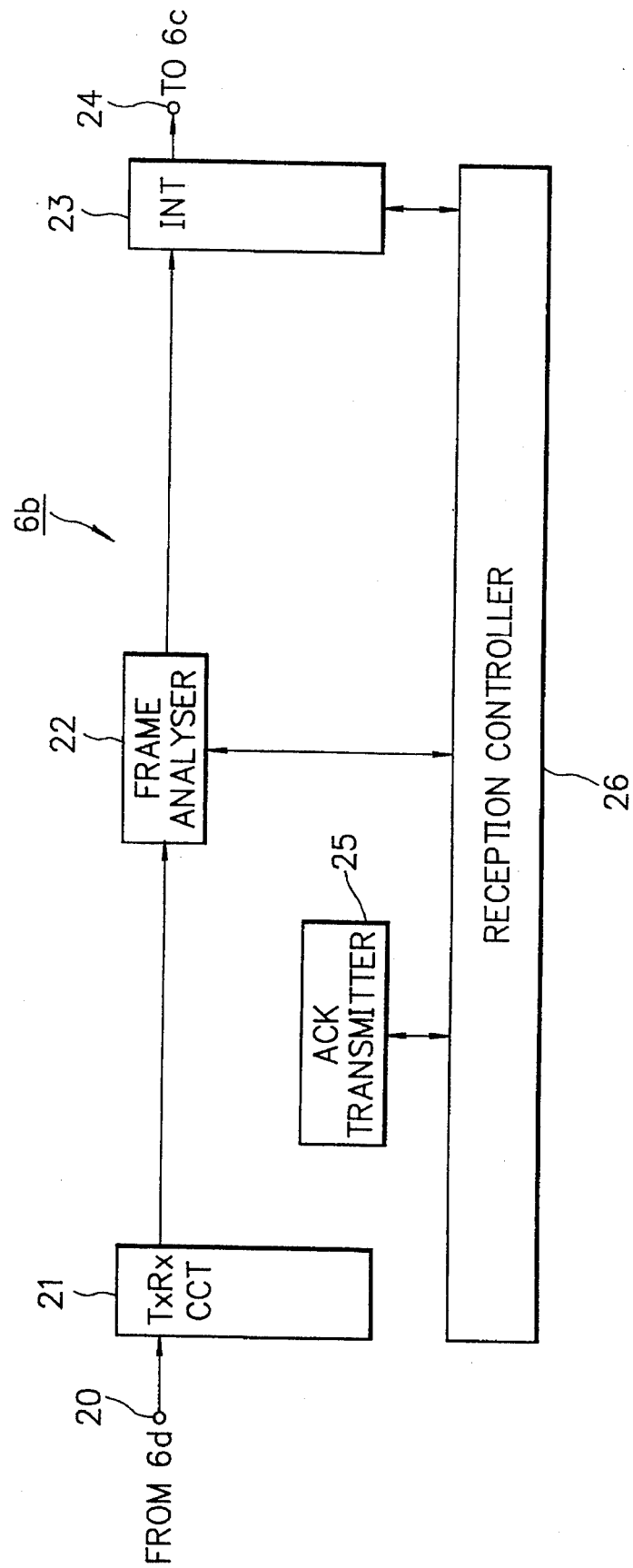
FIG. 6 is a block diagram of a radio receiver in the system arrangement of FIG. 4.

FIG. 6 shows a reception section of the STA 6, i.e. the receiver 6b and a TxRx circuit 21 of which an Rx circuit constitutes part of the receiver 6b.

The receiver 6b comprises an input terminal 20 connected to the antenna 6d, the TxRx circuit 21 switched to serve as a Tx circuit or an Rx circuit, a frame analyser 22 for analysing the first frame, a data or MAC frame interface 23, an output terminal 24 connected to the DTE 6c, an ACK transmitter 25 which serves as a transmitter of a response message that may be an ACK, NAK, etc, and a reception controller 26 which controls the reception section. The controller 26 includes an unshown memory.

The framne analyser 22 detects the request message in the message field of the first frame, responds to a presence of any ACK or NAK requesting message to check the entire length of the first frame (FRC may be excluded) for a transmission error between the STA 1 and STA 6, by using the CRC in the FRC of the first frame.

When the checked frame is complete, the analyser 22 informs the controller 26 of the fact. The controller 26 then gives an ACK transmission command whereto the ACK transmitter 25 responds to transmit a second frame with a message field put between the header field and the FRC thereof. The message field has a response message representative of an acknowledgment of a complete reception of the first frame.

If an error is checked or the request message is not decodable, the controller 26 informed of the fact gives a NAK transmission command whereto the transmitter 25 responds to enter a corresponding response message in the message field of the second frame, unless the request is made for an interruption of acknowledgment. The response message may be alone or incombination with a message representative of a current error rate or an associated transmission error.

In the case the first frame received is not provided with the message field, the controller 26 responds to the fact to send the frame through the interface 28 to the DTE 6c.

Figure 7:
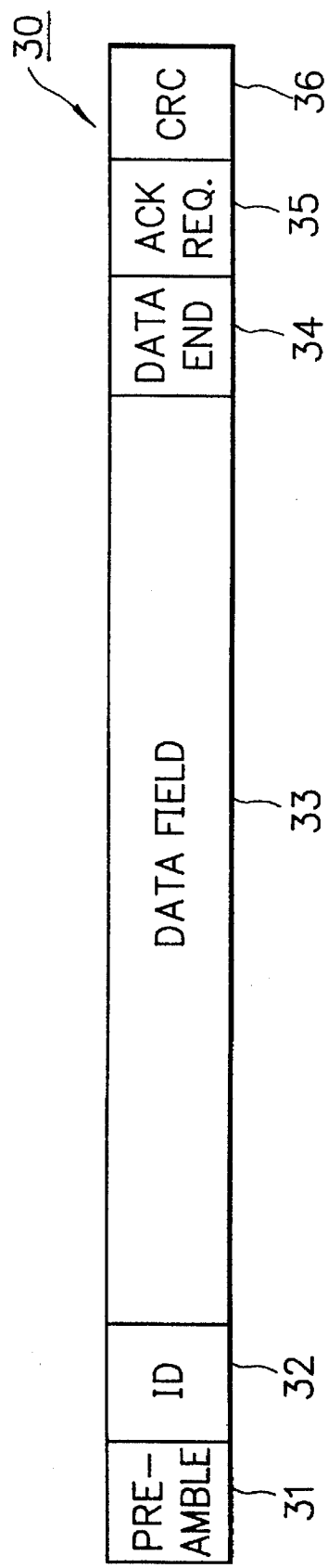
FIG. 7 is a format of a data frame for transmitting a data sequence in the system arrangement of FIG. 4.

FIG. 7 shows an MAC format of the first frame.

Designated at character 80 is the first frame, which comprises a header field consisting of a preamble part 81 and an identification part 82 for identifying the STA 1 and STA 6, a data field consisting of an data sequence part 33 and a data end part 84 which at times may not be counted as part of the data field, an ACK requesting message field 35, and an FRC field 36 containing a CRC. The FRC field may be called CRC.

The frame 30 has a basic length thereof defined as a sum of lengths of parts 31, 32, 33, 34 and 36, and an tire length thereof equal to the basic length plus a length of the message field 35. The insertion of an ACK request message depends on the basic length, as the message field is relatively short. It may depend on the entire length when the formatter of the DTE 1c is switched on, or if the message field is relatively long.

In an ideal transmission where no errors occur, an increased data length per frame results in an increased transmission efficiency, as the data field has an increased proportion to the frame length.

For example, a data fieled length of 100 bits will give a transmission efficiency of ½ when the rest of the frame has a 100-bit length. However, if the data field occupies a length of 9900 bits, the efficiency will amount to $99/100$.

However, in a practical transmission which tends to suffer errors in particular in the radio transmission, an increased data field length is not always advantageous.

For example, letting an error rate be $10^{-6}$ bps, the data field length of 100 bits will encounter an error once per 5000 frames. But, the 9900-bit length will have an error once per 100 frames.

Accordingly, a packet length in terms of the basic length or entire length of the first frame is compared with the threshold value, and the ACK requesting message field 85 is added when the the packet length is larger than the threshold value. The message field may not be inserted if the packet length is smaller than the threshold value. In the case of the acknowledge interruption request, the message field may be added when the packet length is smaller than the threshold value.

The ACK request message may preferably be inserted when the data field length is equal to or smaller than a length of the rest of the first frame 30.

FIG. 8 shows an MAC format applicable to the invention.

Designated at character 40 is an MAC frame, which comprises an MAC header field and a frame body. The headter field consists of a frame control part 41, a BSS identification part 42, a destination address part 43, a source address part 44, a sequence number part 45, a fragment number part 46, and a duration part 47. The frame body 48 may be voluntary, and may include an data field, an message field, and an FRC field.

Figure 9:
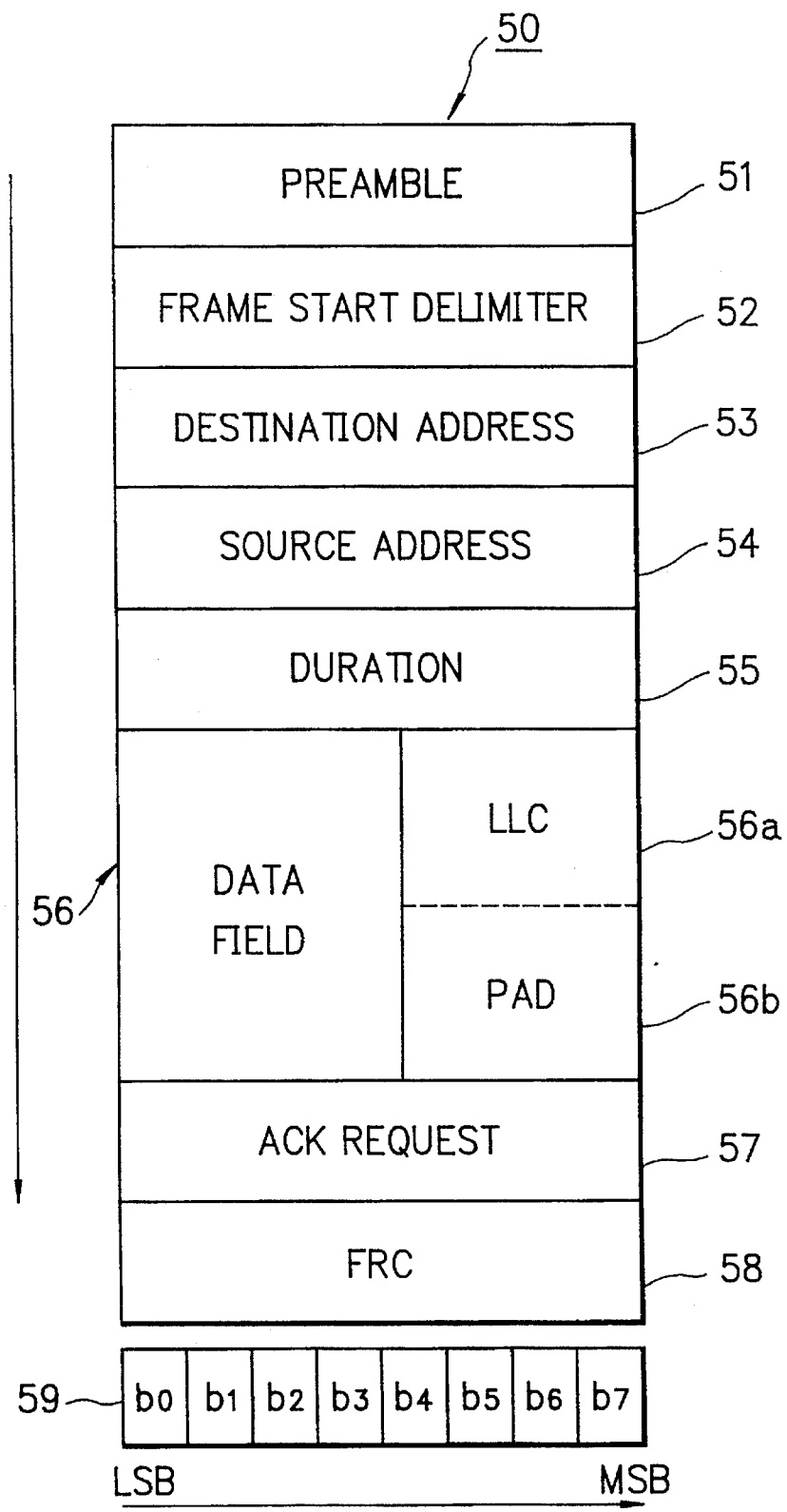
FIG. 9 is a sublayer format of an MAC frame applicable to the invention.

FIG. 9 shows an MAC sublayer format applicable to the invention.

Designated at character 50 is an MAC sublayer frame, which comprises a preamble part 51, a frame start delimiter part 52, a destination address part 53, a source address part 54, a duration part 55, a data field 56, an ACK request part 57, and an FRC part 58. Designated at character 59 is a bit order. Arrows each show a transmission order. The frame 50 thus comprises a header field consisting of parts 51 to 55, the data field 56 consisting of an LLC part 56a and a pad part 56b, the message field 57, and the FRC field 58.

Figure 10:
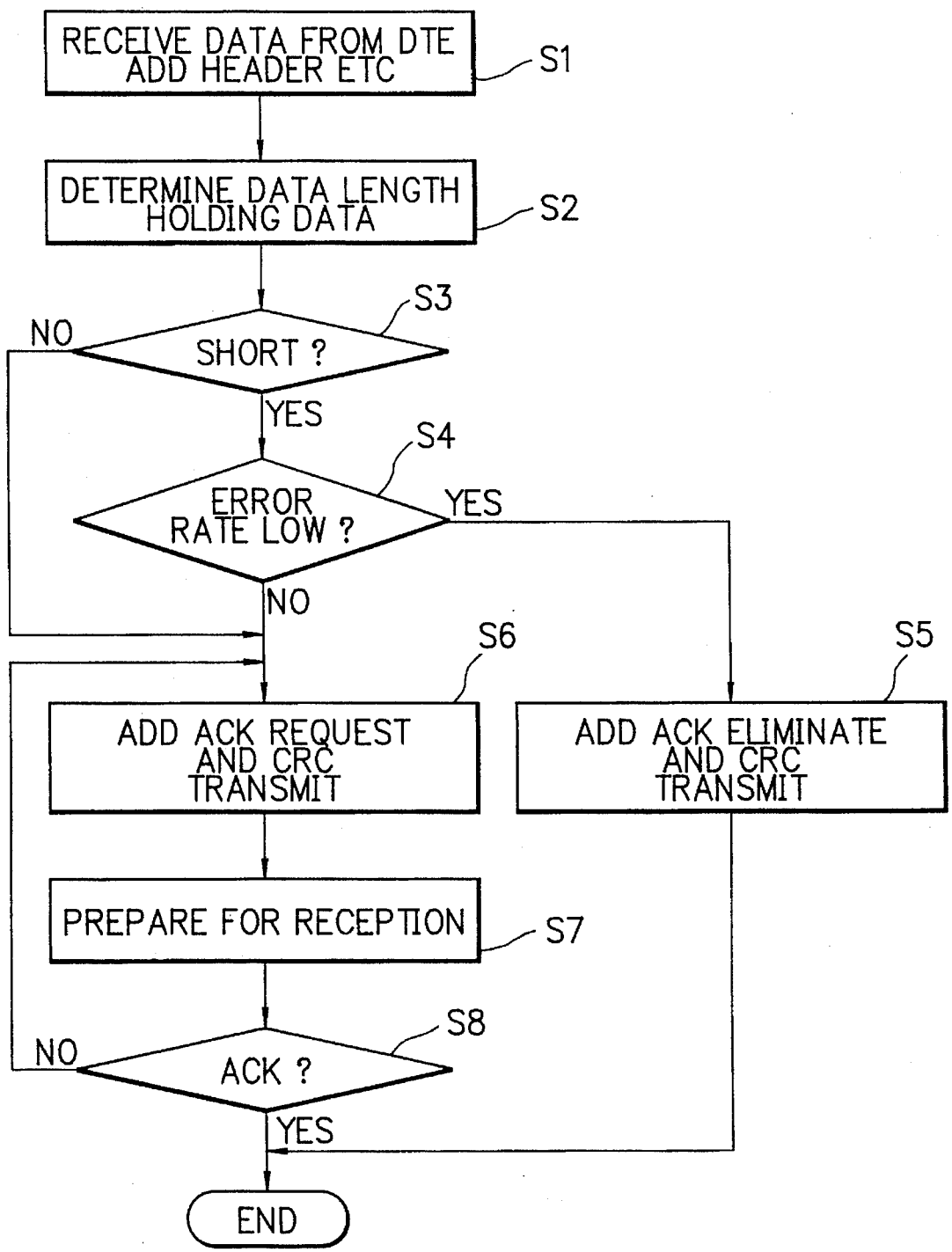
FIG. 10 is a flow chart of a transmission process of the data frame of FIG. 7.

FIG. 10 describes a flow of services by the transmitter 1a.

At a step S1, the interface 11 receives an MAC frame as a data frame or data sequence from the DTE 1c. The MAC frame or data sequence is sent to the frame detector 12, with the contents. The frame detector 12 detects the MAC frame or data sequence, and sends it to the memory 13, the length calculator 14, and the formatter 15. The formatter 15 adds various header parts such as a preamble and an ID to the data field.

At a step S2, a data field length or data length is determined by detection or the like, and the length calculator 14 calculate a basic length. Based thereon, the MAC frame or data seqeunce is reformatted or formatted into a first frame with the basic length, i.e. with a corresponding FRC but without a message field. The MAC frame or the data seqeunce is held stored in the memory 13.

At a step S3, the controller 19 compares the basic length with a threshold value.

When the basic length is larger than the threshold value, the flow goes to a step S6, where a message field with an ACK message is added into the first frame, of which the CRC is thus recalculated. Then, the first frame is transmitted.

If the basic length is short, i.e. smaller than (or equal to) the threshold value, the flow goes to a step S3, where a current value of a statistic error rate is checked. The statistic error rate will be described later. When the error rate is larger than a threshold value thereof, the flow goes to the step S6.

If the error rate is smaller than (or equal to) the threshold value, the flow goes to a step S5, where the controller 19 generates an ACK elimination command whereto the formatter 15 responds so that the first frame is transmitted without the message field. Or otherwise, the first frame may have a message field added with a corresponding request message such as for an interruption of an ACK response. The CRC may be recalculated or left as it has been.

In the case the first frame is transmitted with an ACK request message, the TxRx 17 is switched to Rx at a step S7, waiting a reception of a corresponding ACK response by a second frame from the STA 6.

The MAC frame or data sequence is kept stored in the memory 13. When the ACK response is detecetd, a data transmission process goes to end, permitting the memory 13 to be updated.

If no ACK is detected within a preset time interval, the flow again goes to the steo S6, where the MAC frame or data sequence stored in the memory 13 is read to make up a new first frame.

FIG. 11 describes a flow of services by the receiver 6b.

At the reception side, the first frame is received by the antenna 6d, and is sent through the TxRx 21 to the frame analyser 22, which removes various header parts from the first frame, to detect and analyse message data at a step S10.

In a subsequent decision at a step S11, when the first frame has no message field added thereto, or when no ACK request message is detected in a message field occasionally added, an associated data frame or data sequence is output at a step S15, through the interface 23, to the DTE 6c. Also when an ACK interruption request message is detected, the flow goes to the step S15.

If an ACK request message or an error related response request message is detected, the flow enters another decision step S12, where an occurrence or unoccurrence of a transmission error is checked by using the CRC in the FRC field of the first frame. Such an error check may well be executed, as necessary, even when no relevant message is detected. In a particular case CRC is unnecessary, the FRC field may be deleted or added in combination with a request message field.

When no transmission error is detected of the first frame under service, the flow goes from the step S12 to a step S14, where an ACK message is transmitted by a second frame to the STA 1, as it is requested. Then, associated data frame or data seqeunce is output at the step S15.

If an error is detected, the flow goes from the step 812 to a step S13, where an NAK message is transmitted by a second frame to the STA 1, as it is requested.

The controller 26 gives necessary commands for the receiver components 22, 23 and 25 to provide the services described.

In the case an error rate request message is detected, the receiver 6b is needed to enter an calculation process.

FIG. 12 shows a flow of services for such a process by the receiver 6b. Like protocol is installed in the transmitter 1a.

In a typical wireless LAN system, an error rate of a transmission error between associated STA's tends to vary with time, due to various factors such as a meteorological condition. Under a severe condition, therefore, an ACK request frequency may preferably be increased even for a relatively short first frame. Under a moderate condition, it may however be decreased even for a relatively long first frame.

To effectively implement such a concept, the present embodiment has employed a statistic error rate R as a measure for a decision to request an ACK response.

The error rate R is defined such that;

$$R = A \times \alpha + C$$

where, R is a current value of the statistic error rate, A is a past value thereof, $\alpha$ is an attenuation factor for a temporal weighting, and C is a compensation term such that:

$$C = \beta / L$$

where, $\beta$ is a learnable constant for a weighting of error rate, and L is a sum of packet lengths of ACK-ed first frames in experienced transmissions after a past transmission or a sum of packet lengths of all first frames in the experienced transmissions per a sum of packet lengths of NAK-ed first frames in the experienced transmissions, whichever is smaller. The rate R thus decreases with time or number of first frames transmitted in an associated time interval. The compensation term C may otherwise be determined and at times may be neglected.

The frame analyser 22 or controller 26 of the receiver 6b calculates a current statistic error rate R at the reception side, which is transmitted by a second frame, alone or in combination with an ACK or NAK response message, to the controller 19 of the transmitter 1a, where it is employed as a current error rate at the transmission side, i.e., compared with a threshold value to determine whether a request should be made. The transmitter 1a also is permitted to calculate a current error rate and hence may well request latest information on a transmission error associated with a particular first frame sent to a STA that may not be adapted for the calculation of the statistic error rate.

In FIG. 12, the receiver 6b receives a first frame at a step S20, where the analyser 22 analyses the frame, detecting therefrom a CRC and a request message, if any. Associated information is sent to the controller 26.

At a step S21, the controller 26 judges whether a transmission error has occurred, with respect to the frame received.

When no error has occurred, the controller 26 calculates at a step S22 a current error rate R1 from a latest known error rate A and the factor $\alpha$ such that $R1 = A \times \alpha$, which is transmitted as the current errorrate R to the STA 1 by a second frame, alone or together with a reception acknowledgment message ACK or NAK at a step S23.

If an error has occurred, the controller 26 judges at a step S24 whether a packet length is definedi, i.e., if a length L of the first frame is known.

When the length L is defined, an updated error rate R2 is determined at a step S25 such that $R2 = A \times \alpha + \beta / L$, which value decreases, as the length L increases, or increases, as the length L decreases.

If the length L is not defined, the cause might well be an associated error and hence the controller 26 calcualtes at a step 826 a safer error rate R3 such that $R3 = A \times \alpha + \beta / L_{min}$, where $L_{min}$ is a minimum packet length employed between the STA 1 and STA 6.

Then, letting R2 or R3 be an updated A, this value A is compared at a step S27 with a stored or held upper limit B.

If the value A (=R2 or R3) is larger than the value B, this value B is selected to be transmitted as the current error rate R at the setp S23, and again stored or held for a subsequent comparison. If the value A is smaller than the value B, that value A is selected to be transmitted as the current error rate R at the step S23, and stored or held at a step S28 as a subsequent upper limit B.

At a step S29, the controller 26 judges whether the error rate calculation process is over, i.e., if a current association is continued. If the association is still kept, the flow again goes to the step S20, with an updated or held value B. If the associaiotn is cut, the flow goes to an end.

At the transmission side, the error rate R received from the STA 6 is detected by the ACK detector 16, and informed to the controller 19, where it is compared with a reference value C. When the error rate R is larger than the reference value C, an ACK request message is put in a message field of a subsequent first frame. If the error rate R is smaller than the reference value C, the message field is not added or no ACK is inserted in the subsequent first frame.

A flexible decision in consideration of a temporal variation of an error rate condition is thus achieved, with an efficient data transmission.

According to the embodiments, therefore, an effective decision is made, depending on a basic or entire length of a first frame or a current error rate thereof, for or aginst sending a request message or request messages such as for requesting an acknowledgment of a reception of a first frame, an interruption of an acknowledgment of the reception, and/or a response respresentative an occurrence OF unoccurrence of a transmission error or of a statistic error rate, thereby permitting an efficient data transmission to be achieved with a reduced error rate even for an increased data length, with a maintained transmission rate even for a reduced data length, and/or with a flexible adaptation to a temporal variation of an associated environment.

The foregoing embodiments and modifications are arranged below for easy comprehension.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a calculation means for calculating a total length of the basic fields of the first frame, as a basic length of the first frame; a first control means for depending on the basic length of the first frame to make either of an affirmative decision for and a negative decision against sending a first message for requesting an acknowledgment of a reception of the entire length of the first frame by the second station; a formatter means for formatting the data sequence into the first frame; the formatter means being responsive to the affirmative decision to combine the basic fields of the first frame and a first message field containing the first message, to thereby constitute the first frame; and a first transmission means for transmitting the first frame.

In the wireless LAN system, the second frame consists of a second header field, a second message field with a second message comprising either of a third message and a fourth message respresentative of the acknowledgment of the reception and a negation thereof, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command: and the first transmission means being responsive to the first command to retransmit the first frame.

In the wireless LAN system, the first control means responds to the first state of the first detection signal so that the first command is not generated.

In the wireless LAN system, the first transmission means and the first reception means comprise radio circuitry selectively operable as one of the first transmission means and the first reception means.

In the wireless LAN system, the first station further comprises a memory means for storing therein the first frame.

In the wireless LAN system, the second station compriese: a second reception means for receiving the first frame; a second detection means for detecting the first message in the first frame and for responding to a presence of the first message to detect the reception of the entire length of the first frame to generate a second detection signal having a first state and a second state thereof representative of an occurrence and an unoccurrence of the reception, respectively; a second control means for responding to the first state of the second detection signal to generate a second command; and a second transmission means for responding to the second command to transmit the second frame.

In the wireless LAN system, the second control means responds to the second state of the second detection signal so that the second command is not generated.

In the wireless LAN system, wherein the second transmission means and the second reception means comprise radio circuitry selectively operable as one of the second transmission means and the second reception means.

In the wireless LAN system, the reception of the entire length of the first frame by the second station is defined in terms of a complete reception without a transmission error between the first and second stations.

In the wireless LAN system, the formatter means responds to the negative decision to constitute the first frame by the basic fields thereof.

In the wireless LAN system, the first frame formatted in response to the affirmative decision comprises the first header field including a first identifier for identifying the first station as an initiator and a second identifier for identifying the second station as a recipient, the data field following the first header field, the first message field following the data field, and the first frame check field following the first message field.

In the wireless LAN system, the first control means compares the basic length of the first frame with a threshold value, and makes the affirmative decision when the basic length is larger than the threshold value.

In the wireless LAN system, the calculation means calculates a length difference between the basic length of the first frame and a field length of the data field, and the first control means makes the affirmative decision when the length difference is equal to or larger than the field length of the data field.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a calculation means for calculating a total length of the basic fields of the first frame, as a basic length of the first frame; a first control means for depending on the basic length of the first frame to make either of an affirmative decision for and a negative decision against sending a first message for requesting an interruption of an acknowledgment of a reception of the entire length of the first frame by the second station; a formatter means for formatting the data sequence into the first frame; the formatter means being responsive to the affirmative decision to combine the basic fields of the first frame and a first message field containing the first message, to thereby constitute the first frame; and a first transmission means for transmitting the first frame.

In the wireless LAN system, the second frame consists of a second header field, a second message field with a second message comprising either of a third message and a fourth message respresentative of the acknowledgment of the reception and a negation thereof, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command, subject to the negative decision; and the first transmission means being responsive to the first command to retransmit the first frame.

In the wireless LAN system, the first control means responds to the first state of the first detection signal under the affirmative decision so that the first command is not generated.

In the wireless LAN system, the first station further comprises a memory means for storing therein the first frame.

In the wireless LAN system, the second station comprises: a second reception means for receiving the first frame; a second detection means for detecting the first message in the first frame to generate a second detection signal having a first state and a second state thereof representative of a presence and an absence of the first message, respectively; a second control means for responding to the first state of the second detection signal to generate a second command; and a second transmission means for responding to the second command to interrupt transmitting the second frame.

In the wireless LAN system, the first control means responds to the second state of the second detection signal so that the first command is not generated.

In the wireless LAN system, the first control means compares the basic length of the first frame with a threshold value, and makes the affirmative decision when the basic length is smaller than the threshold value.

A wireless LAN system comprises: a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field: the first station comprising: a calculation means for calculating the entire length of the first frame; a first control means for depending on the entire length of the first frame to make either of an affirmative decision for and a negative decision against sending a first request message for requesting an acknowledgment of a reception of the first frame by the second station; a formatter means for formatting the data sequence into the first frame; the formatter means being responsive to the affirmative decision to place the first request message in the first message field, and to the negative decision to place in the first message field a second request message for requesting an interruption of the acknowledgment of the reception by the second station; a first transmission means for transmitting the first frame; a first reception means for receiving the second frame transmitted in response to the first frame received by the second station, the second frame having in the second message field either of a first response message representative of the acknowledgment of the reception and a second response message respresentative of a negation thereof; a first detection means for detecting either of the first and second response messages in the second message field to generate a first detection signal having a first state and a second state thereof representative of a presence of the first response message and that of the second response message, respectively; the first control means being responsive to the second state of the first detection signal to generate a first command, subject to the affirmative decision: and the first transmission means being responsive to the first command to retransmit the first frame.

In the wireless LAN system, the first station further comprises a memory means for storing therein the first frame.

In the wireless LAN system, the second station comprises: a second reception means for receiving the first frame; a second detection means for detecting either of the first and second request messages in the first message field and for responding to a presence thereof to detect either of an occurrence and an unoccurrence of the reception to generate a second detection signal having a first state and a second state thereof representative of the occurrence and the unoccurrence, respectively; a second control means for responding to the first state of the second detection signal to generate a second command and to the second state of the second detection signal to generate a third command; and a second transmission means for responding to the second command to transmit the second frame with the first response message in the second message field and to the third command to transmit the second frame with the second response message in the second message field.

In the wireless LAN system, the first control means compares the basic length of the first frame with a threshold value, and makes the affirmative decision when the basic length is larger than the threshold value.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a calculation means for calculating a total length of the basic fields of the first frame, as a basic length of the first frame: a first control means for depending on the basic length of the first frame to make either of an affirmative decision for and a negative decision against sending a first message for requesting a response to a reception of the first frame by the second station, the response being representative of a transmission error of the first frame between the first and second stations: a formatter means for formatting the data sequence into the first frame; the formatter means being responsive to the affirmative decision to combine the basic fields of the first frame and a first message field containing the first message, to thereby constitute the first frame; and a first transmission means for transmitting the first frame.

In the wireless LAN system, the second frame consists of a second header field, a second message field with a second message comprising either of a third message and a fourth message respresentative of an occurrence and an lo unoccurrence of the transmission error, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command; and the first transmission means being responsive to the first command to retransmit the first frame.

In the wireless LAN system, the first station further comprises a memory means for storing therein the first frame.

In the wireless LAN system, the second station comprises: a second reception means for receiving the first frame; a second detection means for detecting the first message in the first frame and for responding to a presence of the first message to check for the transmission error to generate a second detection signal having a first state and a second state thereof representative of the occurrence and the unoccurrence of the transmission error, respectively; a second control means for responding to the first state of the second detection signal to generate a second command; and a second transmission means for responding to the second command to transmit the second frame.

In the wireless LAN system, the first control means responds to each of the first and second states of the first detection signal to calculate an error rate of the transmission error, and depends also on the error rate to make the either of the affirmative and negative decisions.

In the wireless LAN system, the first control means compares the error rate with a threshold value, and makes the affirmative decision when the error rate is larger than the threshold value.

In the wireless LAN system, the first control means compares the basic length of the first frame with a threshold value, and makes the affirmative decision when the basic length is larger than the threshold value.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a calculation means for calculating a total length of the basic fields of the first frame, as a basic length of the first frame; a control means for depending on the basic length of the first frame to make either of an affirmative decision for and a negative decision against sending a first message for requesting a response to a reception of the first frame by the second station, the response being representative of an error rate with respect to a transmission error between the first and second stations; a formatter means for formatting the data sequence into the first frame; the formatter means being responsive to the affirmative decision to combine the basic fields of the first frame and a first message field containing the first message, to thereby constitute the first frame; and a transmission means for transmitting the first frame; and the second station responding to the first message to calculate the error rate and to transmit the second frame including in a second message field thereof a second message representative of the error rate.

In the wireless LAN system, the first message further requests an acknowledgment of the reception of the first frame to be complete, and the second station further responds to the first message to detect either of an occurrence and an unoccurrernce of the reception of the first frame to enter in the second message field of the second frame either of a third message representative of the occurrence of the reception and a fourth message representative of the unoccurrence of the reception.

In the wireless LAN system, the first station further comprises: a reception means for receiving the second frame transmitted in response to the first frame received by the second station; a detection means for detecting the third and fourth messages to generate a detection signal having either of a first state and a second state thereof representative of the third and fourth messages, respectively; the control means being responsive to the second state of the detection signal to generate a command; and the transmission means being responsive to the command to retransmit the first frame.

In the wireless LAN system, the first station further comprises a memory means for storing therein the first frame and the error rate.

In the wireless LAN system, the second station comprises a memory means for storing therein the error rate.

In the wireless LAN system, the error rate is defined in terms of a current error rate of the transmission error.

In the wireless LAN system, the control means depends also on a latest value of the error rate to make the either of the affirmative and negative decision.

In the wireless CAN system, the control means compares the basic length of the first frame with a threshold value, and makes the affirmative decision when the basic length is larger than the threshold value.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a memory means for storing therein an updatable record of events in communications with the second station, the record including an event data on a past transmission of the first frame and a value data on an error rate associated therewith; a calculation means for statistically determining a first error rate from the event and value data; a first control means for depending on the first error rate to make either of an affirmative decision for and a negative decision against sending a first message for requesting an acknowledgment of a reception of the entire length of the first frame by the second station; a formatter means for formatting the data sequence into the first frame; the formatter means being responsive to the affirmative decision to combine the basic fields of the first frame and a first message field containing the first message, to thereby constitute the first frame; and a first transmission means for transmitting the first frame.

In the wireless LAN system, the second frame consists of a second header field, a second message field with a second message comprising either of a third message and a fourth message respresentative of the acknowledgment of the reception and a negation thereof, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command: and the first transmission means being responsive to the first command to retransmit the first frame.

In the wireless LAN system, the first control means responds to the first state of the first detection signal so that the first command is not generated.

In the wireless LAN system, the second station comprises: a second reception means for receiving the first frame; a second detection means for detecting the first message in the first frame and for responding to a presence of the first message to detect the reception of the entire length of the first frame to generate a second detection signal having a first state and a second state thereof representative of an occurrence and an unoccurrence of the reception, respectively; a second control means for responding to the first state of the second detection signal to generate a second command; and a second transmission means for responding to the second command to transmit the second frame.

In the wireless LAN system, the second control means responds to the second state of the second detection signal so that the second command is not generated.

In the wireless LAN system, the formatter means responds to the negative decision to constitute the first frame by the basic fields thereof.

In the wireless LAN system, the first control means compares the first error rate with a threshold value, and makes the affirmative decision when the first error rate is larger than the threshold value.

In the wireless LAN system, the first error rate has a decreased value with time.

In the wireless LAN system, the first error rate has a decreased value with an increased frequency of transmission of the first frame.

In the wireless LAN system, the first error rate has an increased value with a decreased frequency of transmission of the first frame.

In the wireless LAN system, the first error rate is determined such that:

$$R = A \times \alpha + C$$

where, R is a current value of the first error rate, A is the associated error rate, $\alpha$ is an attenuation factor, and C is a compensation term.

In the wireless LAN system, the compensation terms is determined such that:

$$C = \beta / L$$

where, $\beta$ is a learnable constant, and L is a sum of respective the entire lengths of respective the first frames in experienced transmissions after the past transmission, acknowledged by the acknowledgment, or a sum of respective the entire lengths of all the first frames in the experienced transmissions per a sum of respective the entire lengths of respective the first frames in the experienced transmissions, not acknowledged by the acknowledgment, whichever is smaller.

In the wireless LAN system, the second station has a second error rate determined therein and informed by the second frame to the first station, to be stored in the memory means.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a memory means for storing therein an updatable record of events in communications with the second station, the record including an event data on a past tranmission of the first frame and a value data on an error rate associated therewith; a calculation means for statistically determining a first error rate from the event and value data; a first control means for depending on the first error rate to make either of an affirmative decision for and a negative decision against sending a first message for requesting an interruption of an acknowledgment of a reception of the entire length of the first frame by the second station; a formatter means for formatting the data sequence into the first frame; the formatter means being responsive to the affirmative decision to combine the basic fields of the first frame and a first message field containing the first message, to thereby constitute the first frame; and a first transmission means for transmitting the first frame.

In the wireless LAN system, the second frame consists of a second header field, a second message field with a second message comprising either of a third message and a fourth message respresentative of the acknowledgment of the reception and a negation thereof, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command, subject to the negative decision; and the first transmission means being responsive to the first command to retransmit the first frame.

In the wireless LAN system, the first control means responds to the first state of the first detection signal under the affirmative decision so that the first command is not generated.

In the wireless LAN system, the second station comprises: a second reception means for receiving the first frame; a second detection means for detecting the first message in the first frame to generate a second detection signal having a first state and a second state thereof representative of a presence and an absence of the first message, respectively; a second control means for responding to the first state of the second detection signal to generate a second command; and a second transmission means for responding to the second command to interrupt transmitting the second frame.

In the wireless LAN system, the first control means responds to the second state of the second detection signal so that the first command is not generated.

In the wireless LAN system, the first control means compares the first error rate with a threshold value, and makes the affirmative decision when the first error rate is smaller than the threshold value.

In the wireless LAN system, the second station has a second error rate determined therein and informed by the second frame to the first station, to be stored in the memory means.

A wireless LAN system comprises: a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field; the first station comprising: a memory means for storing therein an updatable record of events in communications with the second station, the record including an event data on a past tranmission of the first frame and a value data on an error rate associated therewith; a calculation means for statistically determining a first error rate from the event and value data; a first control means for depending on the first error rate to make either of an affirmative decision for and a negative decision against sending a first request message for requesting an acknowledgment of a reception of the first frame by the second station; a formatter means for formatting the data sequence into the first frame; the formatter means being responsive to the affirmative decision to place the first request message in the first message field, and to the negative decision to place in the first message field a second request message for requesting an interruption of the acknowledgment of the reception by the second station; a first transmission means for transmitting the first frame; a first reception means for receiving the second frame transmitted in response to the first frame received by the second station, the second frame having in the second message field either of a first response message representative of the acknowledgment of the reception and a second response message respresentative of a negation thereof; a first detection means for detecting either of the first and second response messages in the second message field to generate a first detection signal having a first state and a second state thereof representative of a presence of the first response message and that of the second response message, respectively: the first control means being responsive to the second state of the first detection signal to generate a first command, subject to the affirmative decision; and the first transmission means being responsive to the first command to retransmit the first frame.

In the wireless LAN system, the second station comprises: a second reception means for receiving the first frame: a second detection means for detecting either of the first and second request messages in the first message field and for responding to a presence thereof to detect either of an occurrence and an unoccurrence of the reception to generate a second detection signal having a first state and a second state thereof representative of the occurrence and the unoccurrence, respectively; a second control means for responding to the first state of the second detection signal to generate a second command and to the second state of the second detection signal to generate a third command; and a second transmission means for responding to the second command to transmit the second frame with the first response message in the second message field and to the third command to transmit the second frame with the second response message in the second message field.

In the wireless LAN system, the first control means compares the first error rate with a threshold value, and makes the affirmative decision when the first error rate is larger than the threshold value.

In the wireless LAN system, the second station has a second error rate determined therein and informed by the second frame to the first station, to be stored in the memory means.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station; the first station comprising: a memory means for storing therein an updatable record of events in communications with the second station, the record including an event data on a past tranmission of the first frame and a value data on an error rate associated therewith; a calculation means for statistically determining a first error rate from the event and value data; a first control means for depending on the first error rate to make either of an affirmative decision for and a negative decision against sending a first message for requesting a response to a reception of the first frame by the second station, the response being representative of a transmission error of the first frame between the first and second stations; a formatter means for formatting the data sequence into the first frame: the formatter means being responsive to the affirmative decision to combine the basic fields of the first frame and a first message field containing the first message, to thereby constitute the first frame: and a first transmission means for transmitting the first frame.

In the wireless LAN system, the second frame consists of a second header field, a second message field with a second message comprising either of a third message and a fourth message respresentative of an occurrence and an unoccurrence of the transmission error, respectively, and a second frame check field, and the first station further comprises: a first reception means for receiving the second frame transmitted in response to the first frame received by the second station; a first detection means for detecting the second message to generate a first detection signal having a first state and a second state thereof representative of the third and fourth messages, respectively; the first control means being responsive to the second state of the first detection signal to generate a first command; and the first transmission means being responsive to the first command to retransmit the first frame.

In the wireless LAN system, the second station comprises: a second reception means for receiving the first frame; a second detection means for detecting the first message in the first frame and for responding to a presence of the first message to check for the transmission error to generate a second detection signal having a first state and a second state thereof representative of the occurrence and the unoccurrence of the transmission error, respectively; a second control means for responding to the first state of the second detection signal to generate a second command; and a second transmission means for responding to the second command to transmit the second frame.

In the wireless LAN system, the first control means responds to each of the first and second states of the first detection signal to update the first error rate.

In the wireless LAN system, the first control means compares the first error rate with a threshold value, and makes the affirmative decision when the first error rate is larger than the threshold value.

In the wireless LAN system, the second station has a second error rate determined therein and informed by the second frame to the first station, to be stored in the memory means.

A wireless LAN system comprises: a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station: the first station comprising: a memory means for storing therein an updatable record of events in communications with the second station, the record including an event data on a past tranmission of the first frame and a value data on an error rate associated therewith; a calculation means for statistically determining a first error rate from the event value data; a control means for depending on the first error rate to make either of an affirmative decision for and a negative decision against sending a first message for requesting a response to a reception of the first frame by the second station, the response being representative of a second error rate calculated at the second station with respect to a transmission error of the first frame; a formatter means for formatting the data sequence into the first frame: the formatter means being responsive to the affirmative decision to combine the basic fields of the first frame and a first message field containing the first message, to thereby constitute the first frame; and a transmission means for transmitting the first frame; the second station responding to the first message to calculate the second error rate and to transmit the second frame including in a second message field thereof a second message representative of the second error rate.

In the wireless LAN system, the first message further requests an acknowledgment of the reception of the first frame to be complete, and the second station further responds to the first message to detect either of an occurrence and an unoccurremce of the reception of the first frame to enter in the second message field of the second frame either of a third message representative of the occurrence of the reception and a fourth message representative of the unoccurrence of the reception.

In the wireless LAN system, the first station further comprises: a reception means for receiving the second frame transmitted in response to the first frame received by the second station; a detection means for detecting the third and fourth messages to generate a detection signal having either of a first state and a second state thereof representative of the third and fourth messages, respectively; the control means being responsive to the second state of the detection signal to generate a command; and the transmission means being responsive to the command to retransmit the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: calculating a total length of the basic fields of the first frame, as a basic length of the first frame; depending on the basic length of the first frame to make either of an affirmative decision for and a negative decision against sending a first message for requesting an acknowledgment of a reception of the entire length of the first frame by the second station; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: calculating a total length of the basic fields of the first frame, as a basic length of the first frame; depending on the basic length of the first frame to make either of an affirmative decision for and a negative decision against sending a first message for requesting an interruption of an acknowledgment of a reception of the entire length of the first frame by the second station; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field, comprises the steps of: calculating the entire length of the first frame; depending on the entire length of the first frame to make either of an affirmative decision for and a negative decision against sending a first request message for requesting an acknowledgment of a reception of the first frame by the second station; formatting the data sequence into the first frame, by responding to the affirmative decision to place the first request message in the first message field, and to the negative decision to place in the first message field a second request message for requesting an interruption of the acknowledgment of the reception by the second station; transmitting the first frame; receiving the second frame transmitted in response to the first frame received by the second station, the second frame having in the second message field either of a first response message representative of the acknowledgment of the reception and a second response message respresentative of a negation thereof; detecting either of the first and second response messages in the second message field to generate a first detection signal having a first state and a second state thereof representative of a presence of the first response message and that of the second response message, respectively; responding to the second state of the first detection signal to generate a first command, subject to the affirmative decision; and responding to the first command to retransmit the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: calculating a total length of the basic fields of the first frame, as a basic length of the first frame: depending on the basic length of the first frame to make either of an affirmative decision for and a negative decision against sending a first message for requesting a response to a reception of the first frame by the second station, the response being representative of a transmission error of the first frame between the first and second stations; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: calculating a total length of the basic fields of the first frame, as a basic length of the first frame; depending on the basic length of the first frame to make either of an affirmative decision for and a negative decision against sending a first message for requesting a response to a reception of the first frame by the second station, the response being representative of an error rate with respect to a transmission error between the first and second stations; formatting the data sequence into the first frame, by responding to the affirmative decision to combine the basic fields of the first frame and a first message field containing the first message, to thereby constitute the first frame; transmitting the first frame; and responding to the first message to calculate the error rate and to transmit the second frame including in a second message field thereof a second message representative of the error rate.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: storing in the first station an updatable record of events in communications with the second station, the record including an event data on a past tranmission of the first frame and a value data on an error rate associated therewith; statistically determining a first error rate from the event and value data; depending on the first error rate to make either of an affirmative decision for and a negative decision against sending a first message for requesting an acknowledgment of a reception of the entire length of the first frame by the second station; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: storing in the first station an updatable record of events in communications with the second station, the record including an event data on a past tranmission of the first frame and a value data on an error rate associated therewith; statistically determining a first error rate from the event and value data; depending on the first error rate to make either of an affirmative decision for and a negative decision against sending a first message for requesting an interruption of an acknowledgment of a reception of the entire length of the first frame by the second station; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame being composed of a first header field, a data field with a length-variable data sequence, a first message field, and a first frame check field with a calculated value for a check of an entire length of the first frame, and a formatted second frame is transmittable from the second station to the first station, the second frame being composed of a second header field, a second message field, and a second frame check field, comprises the steps of: storing in the first station an updatable record of events in communications with the second station, the record including an event data on a past tranmission of the first frame and a value data on an error rate associated therewith: statistically determining a first error rate from the event and value data; depending on the first error rate to make either of an affirmative decision for and a negative decision against sending a first request message for requesting an acknowledgment of a reception of the first frame by the second station; formatting the data sequence into the first frame, by responding to the affirmative decision to place the first request message in the first message field, and to the negative decision to place in the first message field a second request message for requesting an interruption of the acknowledgment of the reception by the second station; transmitting the first frame; receiving the second frame transmitted in response to the first frame received by the second station, the second frame having in the second message field either of a first response message representative of the acknowledgment of the reception and a second response message respresentative of a negation thereof; detecting either of the first and second response messages in the second message field to generate a first detection signal having a first state and a second state thereof representative of a presence of the first response message and that of the second response message, respectively; responding to the second state of the first detection signal to generate a first command, subject to the affirmative decision; and responding to the first command to retransmit the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: storing in the first station an updatable record of events in communications with the second station, the record including an event data on a past tranmission of the first frame and a value data on an error rate associated therewith; statistically determining a first error rate from the event and value data; depending on the first error rate to make either of an affirmative decision for and a negative decision against sending a first message for requesting a response to a reception of the first frame by the second station, the response being representative of a transmission error of the first frame between the first and second stations; formatting the data sequence into the first frame, by responding to the affirmative decision to combine the basic fields of the first frame and a first message field containing the first message, to thereby constitute the first frame; and transmitting the first frame.

A data transfer method for a wireless LAN system including a first station and a second station having an established association with each other so that a formatted first frame is transmittable from the first station to the second station, the first frame including as basic fields thereof a first header field, a data field with a length-variable data sequence, and a first frame check field with a calculated value for a check of an entire length of the first frame, and a formatted second frame is transmittable from the second station to the first station, comprises the steps of: storing in the first station an updatable record of events in communications with the second station, the record including an event data on a past tranmission of the first frame and a value data on an error rate associated therewith; statistically determining a first error rate from the event and value data; depending on the first error rate to make either of an affirmative decision for and a negative decision against sending a first message for requesting a response to a reception of the first frame by the second station, the response being representative of a second error rate calculated at the second station with respect to a transmission error of the first frame; formatting the data sequence into the first frame, by responding to the affirmative decision to combine the basic fields of the first frame and a first message field containing the first message, to thereby constitute the first frame; transmitting the first frame; and responding to the first message to calculate the second error rate and to transmit the second frame including in a second message field thereof a second message representative of the second error rate.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A wireless LAN system, comprising:
   a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station:
   said first station comprising:
      a calculation means for calculating a total length of said basic fields of said first frame, as a basic length of said first frame;
      a first control means for depending on said basic length of said first frame to make either of an affirmative decision for and a negative decision against sending a first message for requesting an acknowledgment of a reception of said entire length of said first frame by said second station;
      a formatter means for formatting said data sequence into said first frame;
      said formatter means being responsive to said affirmative decision to combine said basic fields of said first frame and a first message field containing said first message, to thereby constitute said first frame; and
      a first transmission means for transmitting said first frame.

2. A wireless LAN system according to claim 1, wherein said second frame consists of a second header field, a second message field with a second message comprising either of a third message and a fourth message respresentative of said acknowledgment of said reception and a negation thereof, respectively, and a second frame check field, and
   wherein said first station further comprises:
      a first reception means for receiving said second frame transmitted in response to said first frame received by said second station;
      a first detection means for detecting said second message to generate a first detection signal having a first state and a second state thereof representative of said third and fourth messages, respectively;
      said first control means being responsive to said second state of said first detection signal to generate a first command; and
      said first transmission means being responsive to said first command to retransmit said first frame.

3. A wireless LAN system according to claim 2, wherein said first control means responds to said first state of said first detection signal so that said first command is not generated.

4. A wireless LAN system according to claim 2, wherein said first transmission means and said first reception means comprise radio circuitry selectively operable as one of said first transmission means and said first reception means.

5. A wireless LAN system according to claim 2, wherein said first station further comprises a memory means for storing therein said first frame.

6. A wireless LAN system according to claim 2, wherein said second station comprising:

a second reception means for receiving said first frame;

a second detection means for detecting said first message in said first frame and for responding to a presence of said first message to detect said reception of said entire length of said first frame to generate a second detection signal having a first state and a second state thereof representative of an occurrence and an unoccurrence of said reception, respectively;

a second control means for responding to said first state of said second detection signal to generate a second command; and a second transmission means for responding to said second command to transmit said second frame.

7. A wireless LAN system according to claim 6, wherein said second control means responds to said second state of said second detection signal so that said second command is not generated.

8. A wireless LAN system according to claim 6, wherein said second transmission means and said second reception means comprise radio circuitry selectively operable as one of said second transmission means and said second reception means.

9. A wireless LAN system according to claim 1, wherein said reception of said entire length of said first frame by said second station is defined in terms of a complete reception without a transmission error between said first and second stations.

10. A wireless LAN system according to claim 1, wherein said formatter means responds to said negative decision to constitute said first frame by said basic fields thereof.

11. A wireless LAN system according to claim 1, wherein said first frame formatted in response to said affirmative decision comprises said first header field including a first identifier for identifying said first station as an initiator and a second identifier for identifying said second station as a recipient, said data field following said first header field, said first message field following said data field, and said first frame check field following said first message field.

12. A wireless LAN system according to claim 1, wherein said first control means compares said basic length of said first frame with a threshold value, and makes said affirmative decision when said basic length is larger than said threshold value.

13. A wireless LAN system according to claim 1, wherein said calculation means calculates a length difference between said basic length of said first frame and a field length of said data field, and wherein said first control means makes said affirmative decision when said length difference is equal to or larger than said field length of said data field.

14. A wireless LAN system, comprising:

a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising;

a calculation means for calculating a total length of said basic fields of said first frame, as a basic length of said first frame;

a first control means for depending on said basic length of said first frame to make either of an affirmative decision for and a negative decision against sending a first message for requesting an interruption of an acknowledgment of a reception of said entire length of said first frame by said second station;

a formatter means for formatting said data sequence into said first frame;

said formatter means being responsive to said affirmative decision to combine said basic fields of said first frame and a first message field containing said first message, to thereby constitute said first frame; and a first transmission means for transmitting said first frame.

15. A wireless LAN system according to claim 14, wherein said second frame consists of a second header field, a second message field with a second message comprising either of a third message and a fourth message respresentative of said acknowledgment of said reception and a negation thereof, respectively, and a second frame check field, and wherein said first station further comprises:

a first reception means for receiving said second frame transmitted in response to said first frame received by said second station;

a first detection means for detecting said second message to generate a first detection signal having a first state and a second state thereof representative of said third and fourth messages, respectively;

said first control means being responsive to said second state of said first detection signal to generate a first command, subject to said negative decision; and said first transmission means being responsive to said first command to retransmit said first frame.

16. A wireless LAN system according to claim 15, wherein said first control means responds to said first state of said first detection signal under said affirmative decision so that said first command is not generated.

17. A wireless LAN system according to claim 15, wherein said first station further comprises a memory means for storing therein said first frame.

18. A wireless LAN system according to claim 15, wherein said second station comprising:

a second reception means for receiving said first frame;

a second detection means for detecting said first message in said first frame to generate a second detection signal having a first state and a second state thereof representative of a presence and an absence of said first message, respectively;

a second control means for responding to said first state of said second detection signal to generate a second command; and a second transmission means for responding to said second command to interrupt transmitting said second frame.

19. A wireless LAN system according to claim 18, wherein said first control means responds to said second state of said second detection signal so that said first command is not generated.

20. A wireless LAN system according to claim 14, wherein said first control means compares said basic length of said first frame with a threshold value, and makes said affirmative decision when said basic length is smaller than said threshold value.

21. A wireless LAN system, comprising:

a first station and a second station having an established association with each other so that a formatted first frame is transmittable from said first station to said second station, said first frame being composed of a first header field, a data field with a variable-length data sequence, a first message field, and a first frame check field with a calculated value for a check of an entire length of said first frame, and a formatted second frame is transmittable from said second station to said first station, said second frame being composed of a second header field, a second message field, and a second frame check field;

said first station comprising:
- a calculation means for calculating said entire length of said first frame;
- a first control means for depending on said entire length of said first frame to make either of an affirmative decision for and a negative decision against sending a first request message for requesting an acknowledgment of a reception of said first frame by said second station;
- a formatter means for formatting said data sequence into said first frame;
- said formatter means being responsive to said affirmative decision to place said first request message in said first message field, and to said negative decision to place in said first message field a second request message for requesting an interruption of said acknowledgment of said reception by said second station;
- a first transmission means for transmitting said first frame;
- a first reception means for receiving said second frame transmitted in response to said first frame received by said second station, said second frame having in said second message field either of a first response message representative of said acknowledgment of said reception and a second response message respresentative of a negation thereof;
- a first detection means for detecting either of said first and second response messages in said second message field to generate a first detection signal having a first state and a second state thereof representative of a presence of said first response message and that of said second response message, respectively;
- said first control means being responsive to said second state of said first detection signal to generate a first command, subject to said affirmative decision; and
- said first transmission means being responsive to said first command to retransmit said first frame.

22. A wireless LAN system according to claim 21, wherein said first station further comprises a memory means for storing therein said first frame.

23. A wireless LAN system according to claim 21, wherein said second station comprises:
- a second reception means for receiving said first frame;
- a second detection means for detecting either of said first and second request messages in said first message field and for responding to a presence thereof to detect either of an occurrence and an unoccurrence of said reception to generate a second detection signal having a first state and a second state thereof representative of said occurrence and said unoccurrence, respectively;
- a second control means for responding to said first state of said second detection signal to generate a second command and to said second state of said second detection signal to generate a third command; and
- a second transmission means for responding to said second command to transmit said second frame with said first response message in said second message field and to said third command to transmit said second frame with said second response message in said second message field.

24. A wireless LAN system according to claim 21, wherein said first control means compares said basic length of said first frame with a threshold value, and makes said affirmative decision when said basic length is larger than said threshold value.

25. A wireless LAN system, comprising:
- a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising:
- a calculation means for calculating a total length of said basic fields of said first frame, as a basic length of said first frame;
- a first control means for depending on said basic length of said first frame to make either of an affirmative decision for and a negative decision against sending a first message for requesting a response to a reception of said first frame by said second station, said response being representative of a transmission error of said first frame between said first and second stations;
- a formatter means for formatting said data sequence into said first frame;
- said formatter means being responsive to said affirmative decision to combine said basic fields of said first frame and a first message field containing said first message, to thereby constitute said first frame; and
- a first transmission means for transmitting said first frame.

26. A wireless LAN system according to claim 25, wherein said second frame consists of a second header field, a second message field with a second message comprising either of a third message and a fourth message respresentative of an occurrence and an unoccurrence of said transmission error, respectively, and a second frame check field, and wherein said first station further comprises:
- a first reception means for receiving said second frame transmitted in response to said first frame received by said second station;
- a first detection means for detecting said second message to generate a first detection signal having a first state and a second state thereof representative of said third and fourth messages, respectively;
- said first control means being responsive to said second state of said first detection signal to generate a first command; and
- said first transmission means being responsive to said first command to retransmit said first frame.

27. A wireless LAN system according to claim 26, wherein said first station further comprises a memory means for storing therein said first frame.

28. A wireless LAN system according to claim 26, wherein said second station comprises:
- a second reception means for receiving said first frame;
- a second detection means for detecting said first message in said first frame and for responding to a presence of said first message to check for said transmission error to generate a second detection signal having a first state and a second state thereof representative of said occurrence and said unoccurrence of said transmission error, respectively;

a second control means for responding to said first state of said second detection signal to generate a second command; and a second transmission means for responding to said second command to transmit said second frame.

29. A wireless LAN system according to claim 26, wherein said first control means responds to each of said first and second states of said first detection signal to calculate an error rate of said transmission error, and depends also on said error rate to make said either of said affirmative and negative decisions.

30. A wireless LAN system according to claim 29, wherein said first control means compares said error rate with a threshold value, and makes said affirmative decision when said error rate is larger than said threshold value.

31. A wireless LAN system according to claim 25, wherein said first control means compares said basic length of said first frame with a threshold value, and makes said affirmative decision when said basic length is larger than said threshold value.

32. A wireless LAN system, comprising:

a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising:
a calculation means for calculating a total length of said basic fields of said first frame, as a basic length of said first frame;
a control means for depending on said basic length of said first frame to make either of an affirmative decision for and a negative decision against sending a first message for requesting a response to a reception of said first frame by said second station, said response being representative of an error rate with respect to a transmission error between said first and second stations;
a formatter means for formatting said data sequence into said first frame;
said formatter means being responsive to said affirmative decision to combine said basic fields of said first frame and a first message field containing said first message, to thereby constitute said first frame; and
a transmission means for transmitting said first frame; and said second station responding to said first message to calculate said error rate and to transmit said second frame including in a second message field thereof a second message representative of said error rate.

33. A wireless LAN system according to claim 32, wherein said first message further requests an acknowledgment of said reception of said first frame to be complete, and wherein said second station further responds to said first message to detect either of an occurrence and an unoccurremce of said reception of said first frame to enter in said second message field of said second frame either of a third message representative of said occurrence of said reception and a fourth message representative of said unoccurrence of said reception.

34. A wireless LAN system according to claim 33, wherein said first station further comprises:

a reception means for receiving said second frame transmitted in response to said first frame received by said second station;

a detection means for detecting said third and fourth messages to generate a detection signal having either of a first state and a second state thereof representative of said third and fourth messages, respectively;

said control means being responsive to said second state of said detection signal to generate a command; and said transmission means being responsive to said command to retransmit said first frame.

35. A wireless LAN system according to claim 34, wherein said first station further comprises a memory means for storing therein said first frame and said error rate.

36. A wireless LAN system according to claim 33, wherein said second station comprises a memory means for storing therein said error rate.

37. A wireless LAN system according to claim 33, wherein said error rate is defined in terms of a current error rate of said transmission error.

38. A wireless LAN system according to claim 37, wherein said control means depends also on a latest value of said error rate to make said either of said affirmative and negative decision.

39. A wireless LAN system according to claim 32, wherein said control means compares said basic length of said first frame with a threshold value, and makes said affirmative decision when said basic length is larger than said threshold value.

40. A wireless LAN system, comprising:

a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising:
a memory means for storing therein an updatable record of events in communications with said second station, said record including an event data on a past tranmission of said first frame and a value data on an error rate associated therewith;
a calculation means for statistically determining a first error rate from said event data and said value data:
a first control means for depending on said first error rate to make either of an affirmative decision for and a negative decision against sending a first message for requesting an acknowledgment of a reception of said entire length of said first frame by said second station;
a formatter means for formatting said data sequence into said first frame;
said formatter means being responsive to said affirmative decision to combine said basic fields of said first frame and a first message field containing said first message, to thereby constitute said first frame; and
a first transmission means for transmitting said first frame.

41. A wireless LAN system according to claim 40, wherein said second frame consists of a second header field, a second message field with a second message comprising either of a third message and a fourth message respresentative of said acknowledgment of said reception and a negation thereof, respectively, and a second frame check field, and wherein said first station further comprises:
    a first reception means for receiving said second frame transmitted in response to said first frame received by said second station;
    a first detection means for detecting said second message to generate a first detection signal having a first state and a second state thereof representative of said third and fourth messages, respectively;
    said first control means being responsive to said second state of said first detection signal to generate a first command; and
    said first transmission means being responsive to said first command to retransmit said first frame.

42. A wireless LAN system according to claim 40, wherein said first control means responds to said first state of said first detection signal so that said first command is not generated.

43. A wireless LAN system according to claim 41, wherein said second station comprising:
  a second reception means for receiving said first frame;
  a second detection means for detecting said first message in said first frame and for responding to a presence of said first message to detect said reception of said entire length of said first frame to generate a second detection signal having a first state and a second state thereof representative of an occurrence and an unoccurrence of said reception, respectively;
  a second control means for responding to said first state of said second detection signal to generate a second command; and
  a second transmission means for responding to said second command to transmit said second frame.

44. A wireless LAN system according to claim 43, wherein said second control means responds to said second state of said second detection signal so that said second command is not generated.

45. A wireless LAN system according to claim 40, wherein said formatter means responds to said negative decision to constitute said first frame by said basic fields thereof.

46. A wireless LAN system according to claim 40, wherein said first control means compares said first error rate with a threshold value, and makes said affirmative decision when said first error rate is larger than said threshold value.

47. A wireless LAN system according to claim 46, wherein said first error rate has a decreased value with time.

48. A wireless LAN system according to claim 46, wherein said first error rate has a decreased value with an increased frequency of transmission of said first frame.

49. A wireless LAN system according to claim 46, wherein said first error rate has an increased value with a decreased frequency of transmission of said first frame.

50. A wireless LAN system according to claim 46, wherein said first error rate is determined such that:

$$R = A \times \alpha + C$$

where, R is a current value of said first error rate, A is said associated error rate, $\alpha$ is an attenuation factor, and C is a compensation term.

51. A wireless LAN system according to claim 50, wherein said compensation terms is determined such that:

$$C = \beta/L$$

where, $\beta$ is a learnable constant, and L is a sum of respective said entire lengths of respective said first frames in experienced transmissions after said past transmission, acknowledged by said acknowledgment, or a sum of respective said entire lengths of all said first frames in said experienced transmissions per a sum of respective said entire lengths of respective said first frames in said experienced transmissions, not acknowledged by said acknowledgment, whichever is smaller.

52. A wireless LAN system according to claim 40, wherein said second station has a second error rate determined therein and informed by said second frame to said first station, to be stored in said memory means.

53. A wireless LAN system, comprising:
  a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;
  said first station comprising:
    a memory means for storing therein an updatable record of events in communications with said second station, said record including an event data on a past tranmission of said first frame and a value data on an error rate associated therewith;
    a calculation means for statistically determining a first error rate from said event data and said value data;
    a first control means for depending on said first error rate to make either of an affirmative decision for and a negative decision against sending a first message for requesting an interruption of an acknowledgment of a reception of said entire length of said first frame by said second station;
    a formatter means for formatting said data sequence into said first frame;
    said formatter means being responsive to said affirmative decision to combine said basic fields of said first frame and a first message field containing said first message, to thereby constitute said first frame; and
    a first transmission means for transmitting said first frame.

54. A wireless LAN system according to claim 53, wherein said second frame consists of a second header field, a second message field with a second message comprising either of a third message and a fourth message respresentative of said acknowledgment of said reception and a negation thereof, respectively, and a second frame check field, and wherein said first station further comprises:
    a first reception means for receiving said second frame transmitted in response to said first frame received by said second station;
    a first detection means for detecting said second message to generate a first detection signal having a first state and a second state thereof representative of said third and fourth messages, respectively;
    said first control means being responsive to said second state of said first detection signal to generate a first command, subject to said negative decision; and said first transmission means being responsive to said first command to retransmit said first frame.

55. A wireless LAN system according to claim 54, wherein said first control means responds to said first state of said first detection signal under said affirmative decision so that said first command is not generated.

56. A wireless LAN system according to claim 54, wherein said second station comprising:

a second reception means for receiving said first frame;

a second detection means for detecting said first message in said first frame to generate a second detection signal having a first state and a second state thereof representative of a presence and an absence of said first message, respectively;

a second control means for responding to said first state of said second detection signal to generate a second command; and a second transmission means for responding to said second command to interrupt transmitting said second frame.

57. A wireless LAN system according to claim 56, wherein said first control means responds to said second state of said second detection signal so that said first command is not generated.

58. A wireless LAN system according to claim 53, wherein said first control means compares said first error rate with a threshold value, and makes said affirmative decision when said first error rate is smaller than said threshold value.

59. A wireless LAN system according to claim 53, wherein said second station has a second error rate determined therein and informed by said second frame to said first station, to be stored in said memory means.

60. A wireless LAN system, comprising:

a first station and a second station having an established association with each other so that a formatted first frame is transmittable from said first station to said second station, said first frame being composed of a first header field, a data field with a variable-length data sequence, a first message field, and a first frame check field with a calculated value for a check of an entire length of said first frame, and a formatted second frame is transmittable from said second station to said first station, said second frame being composed of a second header field, a second message field, and a second frame check field;

said first station comprising:

a memory means for storing therein an updatable record of events in communications with said second station, said record including an event data on a past tranmission of said first frame and a value data on an error rate associated therewith;

a calculation means for statistically determining a first error rate from said event data and said value data;

a first control means for depending on said first error rate to make either of an affirmative decision for and a negative decision against sending a first request message for requesting an acknowledgment of a reception of said first frame by said second station;

a formatter means for formatting said data sequence into said first frame;

said formatter means being responsive to said affirmative decision to place said first request message in said first message field, and to said negative decision to place in said first message field a second request message for requesting an interruption of said acknowledgment of said reception by said second station;

a first transmission means for transmitting said first frame;

a first reception means for receiving said second frame transmitted in response to said first frame received by said second station, said second frame having in said second message field either of a first response message representative of said acknowledgment of said reception and a second response message respresentative of a negation thereof;

a first detection means for detecting either of said first and second response messages in said second message field to generate a first detection signal having a first state and a second state thereof representative of a presence of said first response message and that of said second response message, respectively;

said first control means being responsive to said second state of said first detection signal to generate a first command, subject to said affirmative decision; and said first transmission means being responsive to said first command to retransmit said first frame.

61. A wireless LAN system according to claim 60, wherein said second station comprises:

a second reception means for receiving said first frame;

a second detection means for detecting either of said first and second request messages in said first message field and for responding to a presence thereof to detect either of an occurrence and an unoccurrence of said reception to generate a second detection signal having a first state and a second state thereof representative of said occurrence and said unoccurrence, respectively;

a second control means for responding to said first state of said second detection signal to generate a second command and to said second state of said second detection signal to generate a third command; and a second transmission means for responding to said second command to transmit said second frame with said first response message in said second message field and to said third command to transmit said second frame with said second response message in said second message field.

62. A wireless LAN system according to claim 60, wherein said first control means compares said first error rate with a threshold value, and makes said affirmative decision when said first error rate is larger than said threshold value.

63. A wireless LAN system according to claim 60, wherein said second station has a second error rate determined therein and informed by said second frame to said first station, to be stored in said memory means.

64. A wireless LAN system, comprising:

a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising:

a memory means for storing therein an updatable record of events in communications with said second station, said record including an event data on a past tranmission of said first frame and a value data on an error rate associated therewith;

a calculation means for statistically determining a first error rate from said event data and said value data;

a first control means for depending on said first error rate to make either of an affirmative decision for and a negative decision against sending a first message for requesting a response to a reception of said first frame by said second station, said response being representative of a transmission error of said first frame between said first and second stations;

a formatter means for formatting said data sequence into said first frame;

said formatter means being responsive to said affirmative decision to combine said basic fields of said first frame and a first message field containing said first message, to thereby constitute said first frame; and a first transmission means for transmitting said first frame.

65. A wireless LAN system according to claim 64, wherein said second frame consists of a second header field, a second message field with a second message comprising either of a third message and a fourth message respresentative of an occurrence and an unoccurrence of said transmission error, respectively, and a second frame check field, and wherein said first station further comprises:

a first reception means for receiving said second frame transmitted in response to said first frame received by said second station;

a first detection means for detecting said second message to generate a first detection signal having a first state and a second state thereof representative of said third and fourth messages, respectively;

said first control means being responsive to said second state of said first detection signal to generate a first command; and said first transmission means being responsive to said first command to retransmit said first frame.

66. A wireless LAN system according to claim 65, wherein said second station comprises:

a second reception means for receiving said first frame;

a second detection means for detecting said first message in said first frame and for responding to a presence of said first message to check for said transmission error to generate a second detection signal having a first state and a second state thereof representative of said occurrence and said unoccurrence of said transmission error, respectively;

a second control means for responding to said first state of said second detection signal to generate a second command; and a second transmission means for responding to said second command to transmit said second frame.

67. A wireless LAN system according to claim 65, wherein said first control means responds to each of said first and second states of said first detection signal to update said first error rate.

68. A wireless LAN system according to claim 64, wherein said first control means compares said first error rate with a threshold value, and makes said affirmative decision when said first error rate is larger than said threshold value.

69. A wireless LAN system according to claim 64, wherein said second station has a second error rate determined therein and informed by said second frame to said first station, to be stored in said memory means.

70. A wireless LAN system, comprising:

a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station;

said first station comprising:

a memory means for storing therein an updatable record of events in communications with said second station, said record including an event data on a past tranmission of said first frame and a value data on an error rate associated therewith;

a calculation means for statistically determining a first error rate from said event data and said value data;

a control means for depending on said first error rate to make either of an affirmative decision for and a negative decision against sending a first message for requesting a response to a reception of said first frame by said second station, said response being representative of a second error rate calculated at said second station with respect to a transmission error of said first frame;

a formatter means for formatting said data sequence into said first frame;

said formatter means being responsive to said affirmative decision to combine said basic fields of said first frame and a first message field containing said first message, to thereby constitute said first frame; and a transmission means for transmitting said first frame;

said second station responding to said first message to calculate said second error rate and to transmit said second frame including in a second message field thereof a second message representative of said second error rate.

71. A wireless LAN system according to claim 70, wherein said first message further requests an acknowledgment of said reception of said first frame to be complete, and wherein said second station further responds to said first message to detect either of an occurrence and an unoccurrernce of said reception of said first frame to enter in said second message field of said second frame either of a third message representative of said occurrence of said reception and a fourth message representative of said unoccurrence of said reception.

72. A wireless LAN system according to claim 71, wherein said first station further comprises:

a reception means for receiving said second frame transmitted in response to said first frame received by said second station;

a detection means for detecting said third and fourth messages to generate a detection signal having either of a first state and a second state thereof representative of said third and fourth messages, respectively;

said control means being responsive to said second state of said detection signal to generate a command; and said transmission means being responsive to said command to retransmit said first frame.

73. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

calculating a total length of said basic fields of said first frame, as a basic length of said first frame;

depending on said basic length of said first frame to make either of an affirmative decision for and a negative decision against sending a first message for requesting an acknowledgment of a reception of said entire length of said first frame by said second station;

formatting said data sequence into said first frame, by responding to said affirmative decision to combine said basic fields of said first frame and a first message field containing said first message, to thereby constitute said first frame; and transmitting said first frame.

74. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

calculating a total length of said basic fields of said first frame, as a basic length of said first frame;

depending on said basic length of said first frame to make either of an affirmative decision for and a negative decision against sending a first message for requesting an interruption of an acknowledgment of a reception of said entire length of said first frame by said second station;

formatting said data sequence into said first frame, by responding to said affirmative decision to combine said basic fields of said first frame and a first message field containing said first message, to thereby constitute said first frame; and transmitting said first frame.

75. A data transfer method for a wireless LAN system including a first station and a second station having an established association with each other so that a formatted first frame is transmittable from said first station to said second station, said first frame being composed of a first header field, a data field with a variable-length data sequence, a first message field, and a first frame check field with a calculated value for a check of an entire length of said first frame, and a formatted second frame is transmittable from said second station to said first station, said second frame being composed of a second header field, a second message field, and a second frame check field, said method comprising the steps of:

calculating said entire length of said first frame;

depending on said entire length of said first frame to make either of an affirmative decision for and a negative decision against sending a first request message for requesting an acknowledgment of a reception of said first frame by said second station;

formatting said data sequence into said first frame, by responding to said affirmative decision to place said first request message in said first message field, and to said negative decision to place in said first message field a second request message for requesting an interruption of said acknowledgment of said reception by said second station;

transmitting said first frame;

receiving said second frame transmitted in response to said first frame received by said second station, said second frame having in said second message field either of a first response message representative of said acknowledgment of said reception and a second response message respresentative of a negation thereof;

detecting either of said first and second response messages in said second message field to generate a first detection signal having a first state and a second state thereof representative of a presence of said first response message and that of said second response message, respectively:

responding to said second state of said first detection signal to generate a first command, subject to said affirmative decision; and responding to said first command to retransmit said first frame.

76. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

calculating a total length of said basic fields of said first frame, as a basic length of said first frame;

depending on said basic length of said first frame to make either of an affirmative decision for and a negative decision against sending a first message for requesting a response to a reception of said first frame by said second station, said response being representative of a transmission error of said first frame between said first and second stations;

formatting said data sequence into said first frame, by responding to said affirmative decision to combine said basic fields of said first frame and a first message field containing said first message, to thereby constitute said first frame; and transmitting said first frame.

77. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

calculating a total length of said basic fields of said first frame, as a basic length of said first frame;

depending on said basic length of said first frame to make either of an affirmative decision for and a negative decision against sending a first message for requesting a response to a reception of said first frame by said second station, said response being representative of an error rate with respect to a transmission error between said first and second stations;

formatting said data sequence into said first frame, by responding to said affirmative decision to combine said basic fields of said first frame and a first message field containing said first message, to thereby constitute said first frame;

transmitting said first frame; and responding to said first message to calculate said error rate and to transmit said second frame including in a second message field thereof a second message representative of said error rate.

78. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

storing in said first station an updatable record of events in communications with said second station, said record including an event data on a past tranmission of said first frame and a value data on an error rate associated therewith;

statistically determining a first error rate from said event data and said value data;

depending on said first error rate to make either of an affirmative decision for and a negative decision against sending a first message for requesting an acknowledgment of a reception of said entire length of said first frame by said second station;

formatting said data sequence into said first frame, by responding to said affirmative decision to combine said basic fields of said first frame and a first message field containing said first message, to thereby constitute said first frame; and transmitting said first frame.

79. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

storing in said first station an updatable record of events in communications with said second station, said record including an event data on a past tranmission of said first frame and a value data on an error rate associated therewith;

statistically determining a first error rate from said event data and said value data;

depending on said first error rate to make either of an affirmative decision for and a negative decision against sending a first message for requesting an interruption of an acknowledgment of a reception of said entire length of said first frame by said second station;

formatting said data sequence into said first frame, by responding to said affirmative decision to combine said basic fields of said first frame and a first message field containing said first message, to thereby constitute said first frame; and transmitting said first frame.

80. A data transfer method for a wireless LAN system including a first station and a second station having an established association with each other so that a formatted first frame is transmittable from said first station to said second station, said first frame being composed of a first header field, a data field with a variable-length data sequence, a first message field, and a first frame check field with a calculated value for a check of an entire length of said first frame, and a formatted second frame is transmittable from said second station to said first station, said second frame being composed of a second header field, a second message field, and a second frame check field, said method comprising the steps of:

storing in said first station an updatable record of events in communications with said second station, said record including an event data on a past tranmission of said first frame and a value data on an error rate associated therewith;

statistically determining a first error rate from said event data and said value data;

depending on said first error rate to make either of an affirmative decision for and a negative decision against sending a first request message for requesting an acknowledgment of a reception of said first frame by said second station;

formatting said data sequence into said first frame, by responding to said affirmative decision to place said first request message in said first message field, and to said negative decision to place in said first message field a second request message for requesting an interruption of said acknowledgment of said reception by said second station:

transmitting said first frame;

receiving said second frame transmitted in response to said first frame received by said second station, said second frame having in said second message field either of a first response message representative of said acknowledgment of said reception and a second response message respresentative of a negation thereof;

detecting either of said first and second response messages in said second message field to generate a first detection signal having a first state and a second state thereof representative of a presence of said first response message and that of said second response message, respectively;

responding to said second state of said first detection signal to generate a first command, subject to said affirmative decision; and responding to said first command to retransmit said first frame.

81. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

storing in said first station an updatable record of events in communications with said second station, said record including an event data on a past tranmission of said first frame and a value data on an error rate associated therewith;

statistically determining a first error rate from said event data and said value data;

depending on said first error rate to make either of an affirmative decision for and a negative decision against sending a first message for requesting a response to a reception of said first frame by said second station, said response being representative of a transmission error of said first frame between said first and second stations;

formatting said data sequence into said first frame, by responding to said affirmative decision to combine said basic fields of said first frame and a first message field containing said first message, to thereby constitute said first frame; and transmitting said first frame.

82. A data transfer method for a wireless LAN system including a first station and a second station having an established association with each other so that a formatted first frame is transmittable from said first station to said second station, said first frame including as basic fields thereof a first header field, a data field with a variable-length data sequence, and a first frame check field with a calculated value for a check of an entire length of said first frame, and a formatted second frame is transmittable from said second station to said first station, said method comprising the steps of:

storing in said first station an updatable record of events in communications with said second station, said record including an event data on a past tranmission of said first frame and a value data on an error rate associated therewith;

statistically determining a first error rate from said event and value data;

depending on said first error rate to make either of an affirmative decision for and a negative decision against sending a first message for requesting a response to a reception of said first frame by said second station, said response being representative of a second error rate calculated at said second station with respect to a transmission error of said first frame;

formatting said data sequence into said first frame, by responding to said affirmative decision to combine said basic fields of said first frame and a first message field containing said first message, to thereby constitute said first frame;

transmitting said first frame; and responding to said first message to calculate said second error rate and to transmit said second frame including in a second message field thereof a second message representative of said second error rate.

* * * * *